(12) United States Patent
Otowa et al.

(10) Patent No.: US 12,189,023 B2
(45) Date of Patent: Jan. 7, 2025

(54) RADAR SYSTEM, PROCESSING METHOD, AND PROCESSING PROGRAM

(71) Applicants: FURUKAWA ELECTRIC CO., LTD., Tokyo (JP); FURUKAWA AUTOMOTIVE SYSTEMS INC., Inukami-gun (JP)

(72) Inventors: Satoshi Otowa, Inukami-gun (JP); Yasushi Aoyagi, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 708 days.

(21) Appl. No.: 17/205,057

(22) Filed: Mar. 18, 2021

(65) Prior Publication Data

US 2021/0263146 A1 Aug. 26, 2021

Related U.S. Application Data

(63) Continuation of application No. PCT/JP2020/018982, filed on May 12, 2020.

(30) Foreign Application Priority Data

Feb. 25, 2020 (JP) .................. 2020-029250

(51) Int. Cl.
*G01S 13/931* (2020.01)
*G01S 13/34* (2006.01)
(Continued)

(52) U.S. Cl.
CPC .......... *G01S 13/931* (2013.01); *G01S 13/347* (2013.01); *G01S 13/872* (2013.01); *G01S 13/584* (2013.01)

(58) Field of Classification Search
CPC .... G01S 13/931; G01S 13/347; G01S 13/872; G01S 13/584; G01S 13/87; G01S 2013/93275; G01S 2013/93272
See application file for complete search history.

(56) References Cited

U.S. PATENT DOCUMENTS

| | | | |
|---|---|---|---|
| 7,504,988 B2* | 3/2009 | Tsuchihashi | ............ G01S 13/87 342/158 |
| 10,247,819 B2* | 4/2019 | Aoyagi | ..................... G01S 7/03 |

(Continued)

FOREIGN PATENT DOCUMENTS

| | | |
|---|---|---|
| CN | 101271158 A | 9/2008 |
| CN | 105247385 A | 1/2016 |

(Continued)

OTHER PUBLICATIONS

"IEEE 802.15.4.pdf" (from https://web.archive.org/web/20191120151022/https://www.ieee802.org/15/pub/TG4.html (Year: 2019).*

(Continued)

*Primary Examiner* — Olumide Ajibade Akonai
*Assistant Examiner* — Yonghong Li
(74) *Attorney, Agent, or Firm* — Oblon, McClelland, Maier & Neustadt, L.L.P.

(57) ABSTRACT

A radar apparatus includes a first radar apparatus that transmits and receives a signal with a first frequency and has a first detection area, and a second radar apparatus that transmits and receives a signal with a second frequency different from the first frequency and has a second detection area different from the first detection area. The first radar apparatus and the second radar apparatus are arranged on a vehicle such that the first detection area and the second detection area partially overlap with each other. The second radar apparatus generates second information. The first radar apparatus generates first information, performs arithmetic (Continued)

integration processing based on the first information and the second information to generate integrated information, and transmits the integrated information to a higher-level apparatus.

5 Claims, 17 Drawing Sheets

(51) Int. Cl.
*G01S 13/58* (2006.01)
*G01S 13/87* (2006.01)

(56) References Cited

U.S. PATENT DOCUMENTS

| | | | |
|---|---|---|---|
| 10,571,562 B2* | 2/2020 | Wodrich | ............... G01S 13/878 |
| 2004/0238249 A1 | 12/2004 | Kim | |
| 2008/0136702 A1 | 6/2008 | Tsuchihashi et al. | |
| 2008/0231496 A1 | 9/2008 | Sakamoto | |
| 2009/0002222 A1 | 1/2009 | Colburn et al. | |
| 2010/0103023 A1 | 4/2010 | Ogawa | |
| 2016/0109568 A1 | 4/2016 | Aoyagi et al. | |
| 2017/0045610 A1 | 2/2017 | Mizutani | |
| 2017/0146646 A1 | 5/2017 | Nakabayashi et al. | |
| 2017/0285165 A1* | 10/2017 | Khlifi | .................... G01S 13/931 |
| 2017/0315224 A1 | 11/2017 | Mizutani et al. | |
| 2018/0284267 A1 | 10/2018 | Maisel | |
| 2019/0086511 A1* | 3/2019 | Takeuchi | .............. G01S 7/0235 |
| 2019/0286923 A1 | 9/2019 | Wang et al. | |
| 2019/0293787 A1 | 9/2019 | Sakai et al. | |
| 2020/0033124 A1* | 1/2020 | Lee | ......................... G01S 17/58 |
| 2020/0124713 A1 | 4/2020 | Shimizu et al. | |

FOREIGN PATENT DOCUMENTS

| | | |
|---|---|---|
| CN | 106233158 A | 12/2016 |
| CN | 106537171 A | 3/2017 |
| CN | 107003399 A | 8/2017 |
| CN | 108027420 A | 5/2018 |
| CN | 109155109 A | 1/2019 |
| CN | 110023783 A | 7/2019 |
| CN | 110799851 A | 2/2020 |
| DE | 10356176 B4 | 5/2016 |
| EP | 2 993 488 A1 | 3/2016 |
| EP | 3021134 A1 | 5/2016 |
| JP | 2008-39719 A | 2/2008 |
| JP | 2014-145731 A | 8/2014 |
| JP | 5916878 B2 | 5/2016 |
| JP | 2019-52987 A | 4/2019 |
| WO | WO 2014/178131 A1 | 11/2014 |

OTHER PUBLICATIONS

International Search Report issued Jul. 28, 2020 in PCT/JP2020/018982 filed May 12, 2020 (with English Translation of Categories of Cited Documents), 4 pages.

Combined Chinese Office Action and Search Report issued Jul. 29, 2023, in corresponding Chinese Patent Application No. 202080005785.5 (with English Translation), 13 pages.

Extended European Search Report issued in European Patent Application No. EP20878031.2, mailed on Feb. 16, 2024, 11 pages.

* cited by examiner

RADAR SYSTEM, PROCESSING METHOD, AND PROCESSING PROGRAM

TECHNICAL FIELD

The present disclosure relates to a radar system, a processing method, and a processing program.

BACKGROUND ART

A driving safety support system has been proposed, in which a radar apparatus that detects an object (a target) present at a periphery of a subject vehicle, an imaging apparatus that captures a peripheral image of the subject vehicle, etc. are mounted on the vehicle and the vehicle is, based on information detected by the radar apparatus, the imaging apparatus, etc., controlled such that occurrence of a collision accident with other vehicles etc. is prevented in advance and damage upon collision is reduced.

For example, Patent Document 1 discloses a radar system having a plurality of radar apparatuses and a central processing unit. Specifically, the radar apparatus of the radar system described in Patent Document 1 has a transmitter that transmits a high-frequency signal to a target object, a receiver that receives a signal reflected on a target object, an individual controller that controls a timing of transmission/reception by the transmitter and the receiver, and a converter that converts an output of the receiver into digital data.

Patent Document 1: Japanese Patent No. 5916878

DISCLOSURE OF THE INVENTION

Problems to be Solved by the Invention

However, in a case where a plurality of radar apparatuses forms a radar system, an optimal combination of the radar apparatuses having different detection areas needs to be realized, and the information processing efficiency of the entire system needs to be enhanced. In some cases, the radar system includes an apparatus (an ultrasonic sensor) that emits an ultrasonic wave to a target and measures a distance to a target based on time until a reflective wave returns. However, in some cases, it is difficult for this ultrasonic sensor to detect the target (particularly, a target moving at a certain speed or higher).

An object of the disclosure of the present application is to provide a radar system, a processing method, and a processing program using no ultrasonic sensor so that an optimal combination of radar apparatuses having different detection areas can be realized and the information processing efficiency of the entire system can be enhanced.

Means for Solving the Problems

For solving the above-described problems and accomplishing the object, a radar system according to the present disclosure is a radar system including a radar apparatus that is mounted on a vehicle and that transmits a predetermined signal to an outside of the vehicle and receives a predetermined signal from the outside of the vehicle to detect information regarding a target relative to the vehicle. The radar apparatus includes a first radar apparatus that transmits and receives a signal with a first frequency and has a first detection area, and a second radar apparatus that transmits and receives a signal with a second frequency different from the first frequency and has a second detection area different from the first detection area. The first radar apparatus and the second radar apparatus are arranged on the vehicle such that the first detection area and the second detection area partially overlap with each other. The second radar apparatus generates second information regarding the target relative to the vehicle based on information detected in the second detection area, and transmits the second information to the first radar apparatus. The first radar apparatus generates first information regarding the target relative to the vehicle based on information detected in the first detection area, performs arithmetic integration processing based on the first information and the second information received from the second radar apparatus to generate integrated information, and transmits the integrated information to a higher-level apparatus.

In the above-described disclosure, the radar system according to the present disclosure is configured such that the second radar apparatus includes a plurality of second radar apparatuses and the first radar apparatus performs the arithmetic integration processing based on the first information generated in the first radar apparatus itself and multiple pieces of second information transmitted from the plurality of second radar apparatuses to generate integrated information and transmits the integrated information to the higher-level apparatus.

In the above-described disclosure, the radar system according to the present disclosure is configured such that the first radar apparatus includes a plurality of first radar apparatuses, one of the plurality of first radar apparatuses is a master, and the first radar apparatus as the master performs the arithmetic integration processing based on the information generated in the master first radar apparatus itself and the information transmitted from the other first radar apparatuses to generate integrated information and transmits the integrated information to the higher-level apparatus.

In the above-described disclosure, the radar system according to the present disclosure is configured such that the first radar apparatus generates the first information including information detected in the first detection area and indicating a distance to the target and a speed and an angle relative to the target and the second radar apparatus generates the second information including at least information detected in the second detection area and indicating the distance to the target and the speed relative to the target.

In the above-described disclosure, the radar system according to the present disclosure is configured such that a communication speed between the second radar apparatus and the first radar apparatus is equal to or lower than several tens of kbps and a communication speed between the first radar apparatus and the higher-level apparatus is equal to or lower than several Mbps.

For solving the above-described problems and accomplishing the object, the processing method according to the present disclosure is a processing method in a radar apparatus that is mounted on a vehicle and that transmits a predetermined signal to an outside of the vehicle and receives a predetermined signal from the outside of the vehicle to detect information regarding a target relative to the vehicle. The radar apparatus includes a first radar apparatus that transmits and receives a signal with a first frequency and has a first detection area and a second radar apparatus that transmits and receives a signal with a second frequency different from the first frequency and has a second detection area different from the first detection area. The first radar apparatus and the second radar apparatus are arranged on the vehicle such that the first detection area and the second detection area partially overlap with each other. The processing method includes the first step of generating, by the second radar apparatus, second information regarding the target relative to the vehicle based on information detected in the second detection area and transmitting the second information to the first radar apparatus, and the second step of generating, by the first radar apparatus, first information regarding the target relative to the vehicle based on information detected in the first detection area, performing arithmetic integration processing based on the first information and the second information received from the second radar apparatus to generate integrated information, and transmitting the integrated information to a higher-level apparatus.

For solving the above-described problems and accomplishing the object, the processing program according to the present disclosure is a processing program used for a radar apparatus that is mounted on a vehicle and that transmits a predetermined signal to an outside of the vehicle and receives a predetermined signal from the outside of the vehicle to detect information regarding a target relative to the vehicle. The radar apparatus includes a first radar apparatus that transmits and receives a signal with a first frequency and has a first detection area and a second radar apparatus that transmits and receives a signal with a second frequency different from the first frequency and has a second detection area different from the first detection area. The first radar apparatus and the second radar apparatus are arranged on the vehicle such that the first detection area and the second detection area partially overlap with each other. The processing program causes a computer to execute the first step of generating second information regarding the target relative to the vehicle based on information detected in the second detection area and transmitting the second information to the first radar apparatus and the second step of generating first information regarding the target relative to the vehicle based on information detected in the first detection area, performing arithmetic integration processing based on the first information and the second information received from the second radar apparatus to generate integrated information, and transmitting the integrated information to a higher-level apparatus.

Effects of the Invention

According to the present disclosure, a radar system, a processing method, and a processing program using no ultrasonic sensor are provided so that an optimal combination of the radar apparatuses having different detection areas can be realized and the information processing efficiency of the entire system can be enhanced.

PREFERRED MODE FOR CARRYING OUT THE INVENTION

Hereinafter, a specific radar system will be described.

Note that description below is merely one example of the present disclosure, and needless to say, the present disclosure is not limited only to the scope described below.

(Configuration of Radar System)

Figure 1:
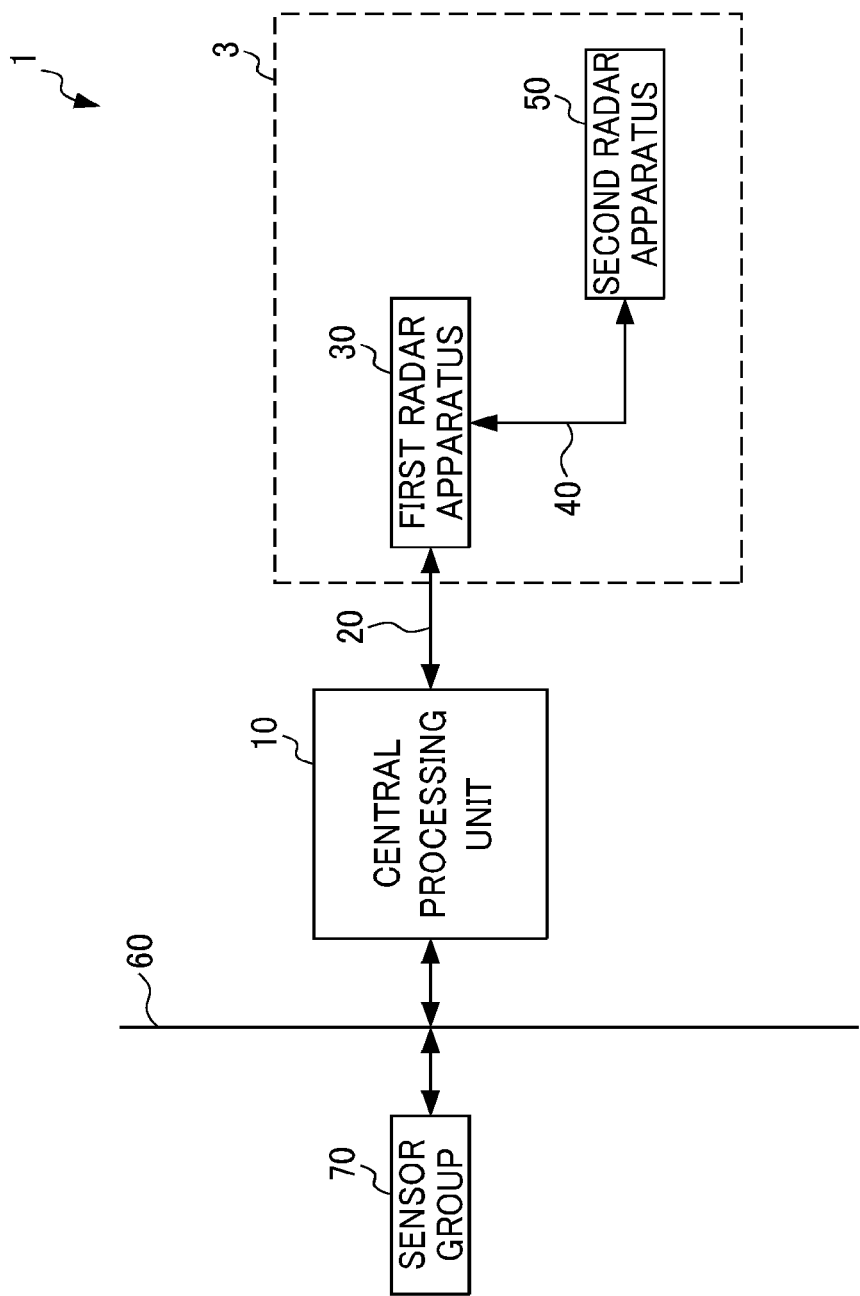
FIG. 1 is a diagram showing a configuration of a radar system.

FIG. 1 is a diagram showing the configuration of the radar system according to the present disclosure. The radar system 1 according to the present disclosure is a system including a radar apparatus 3 that is mounted on a vehicle and that transmits a predetermined signal to an outside of the vehicle and receives a predetermined signal from the outside of the vehicle to detect information regarding a target relative to the vehicle, a central processing unit 10, and a sensor group 70. The central processing unit 10 and the sensor group 70 are connected to each other via a local area network (LAN) 60. Note that the radar system 1 is, for example, mounted on a vehicle such as an automobile or a motorcycle.

The central processing unit 10 described herein performs, for the radar apparatus 3, digital communication for operation synchronization via a connection line 20. Moreover, the central processing unit 10 receives, from the radar apparatus (actually, a first radar apparatus 30), information transmitted via the connection line 20. Further, the central processing unit 10 determines the presence or absence of danger from a position relationship between the target and the subject vehicle based on the received information and offer the determination, for example. Note that the connection line 20 may be a signal line capable of performing, between the central processing unit 10 and the radar apparatus 3, digital communication separated from the control of transmission/reception in the radar apparatus 3, and a signal line according to low voltage differential signaling (LVDS) specifications can be used, for example. Signal lines other than the signal line according to the LVDS specifications can be also used.

The radar apparatus 3 performs, for example, processing after having transmitted a high-frequency pulse signal, having received a reflective wave reflected on the target object, and having converted the reflective wave into digital data (a digital baseband signal) by analog-to-digital (A/D) conversion.

The LAN 60 is provided to exchange information among the central processing unit 10 and other apparatuses, systems, etc. The other apparatuses, systems, etc. include, for example, the sensor group 70. Note that in a case of an in-vehicle network, a controller area network (CAN) is generally used as the LAN 60, but networks other than the CAN may be used. The sensor group 70 has a plurality of sensors that detects the state of the subject vehicle. Specifically, the sensor group 70 has a vehicle speed sensor, a steering angle sensor, a yaw rate sensor, etc. Needless to say, sensors other than these sensors may be provided.

The radar apparatus 3 includes the first radar apparatus 30 that transmits and receives a signal with a first frequency and has a first detection area, and a second radar apparatus 50 that transmits and receives a signal with a second frequency different from the first frequency and has a second detection area different from the first detection area.

Figure 2:
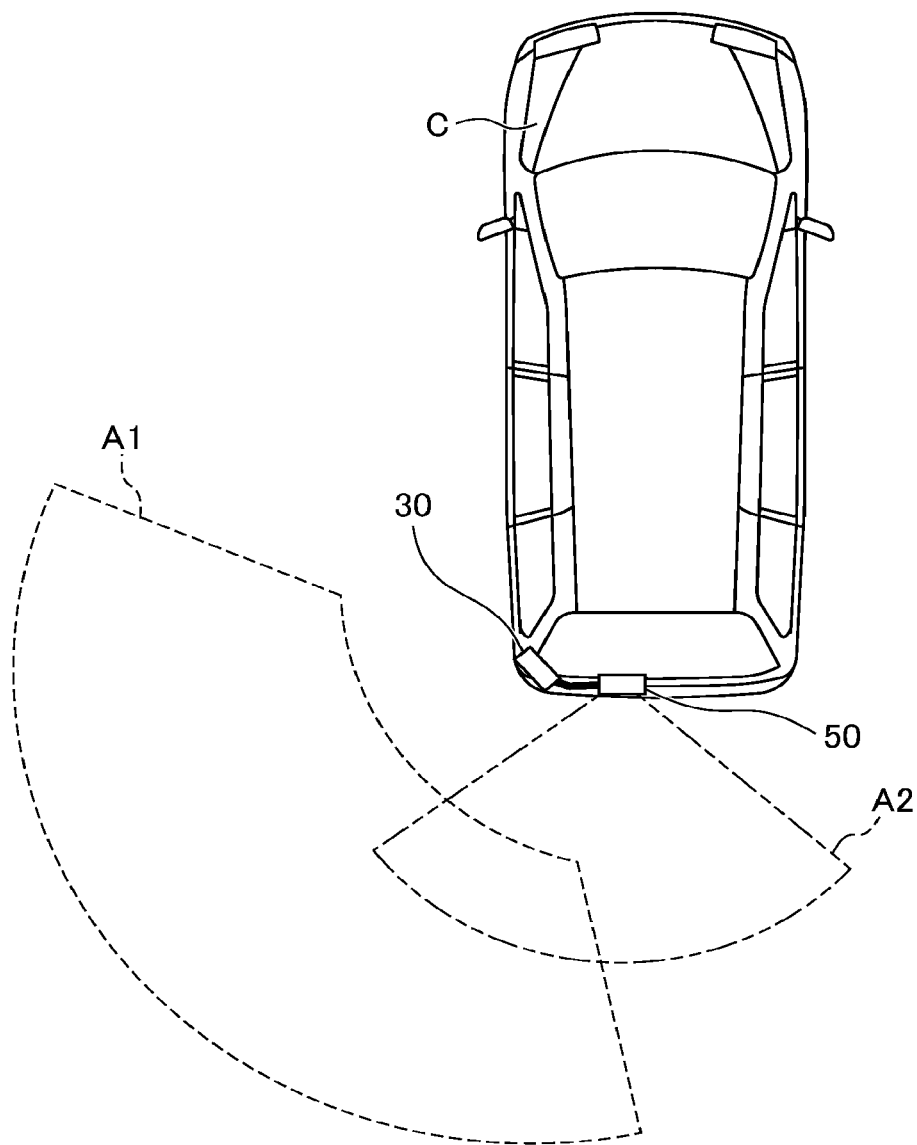
FIG. 2 is a view schematically showing detection areas of a first radar apparatus and a second radar apparatus arranged on a vehicle.

The first radar apparatus 30 and the second radar apparatus 50 are arranged on the vehicle such that the first detection area and the second detection area partially overlap with each other. FIG. 2 is a view schematically showing the detection areas of the first radar apparatus 30 and the second radar apparatus 50 arranged on a vehicle C. Note that FIG. 2 shows a state in which the first radar apparatus 30 and the second radar apparatus 50 are arranged in a left rear bumper of the vehicle, but arrangement locations, the number of radar apparatuses, etc. are one example and are not limited to above. A1 in FIG. 2 indicates the detection area of the first radar apparatus 30. A2 in FIG. 2 indicates the detection area of the second radar apparatus 50. As described above, the detection area A1 and the detection area A2 have an overlapping area. Moreover, the second radar apparatus 50 is arranged to cover a region (e.g., a region near the vehicle C) that cannot be detected by the first radar apparatus 30.

The second radar apparatus 50 generates second information regarding the target relative to the vehicle based on information detected in the second detection area, and transmits the second information to the first radar apparatus 30. The first radar apparatus 30 generates first information regarding the target relative to the vehicle based on information detected in the first detection area, performs arithmetic integration processing based on the first information and the second information received from the second radar apparatus 50 to generate integrated information, and transmits the integrated information to a higher-level apparatus. The higher-level apparatus described herein is the central processing unit 10.

The first radar apparatus 30 generates the first information including information detected in the first detection area and indicating a distance to the target and a speed and an angle relative to the target. The second radar apparatus 50 generates the second information including at least information detected in the second detection area and indicating the distance to the target and the speed relative to the target. Note that the second radar apparatus 50 may include a plurality of reception antennas. In the case of this configuration, information indicating an angle is also included in the second information.

Figure 3:
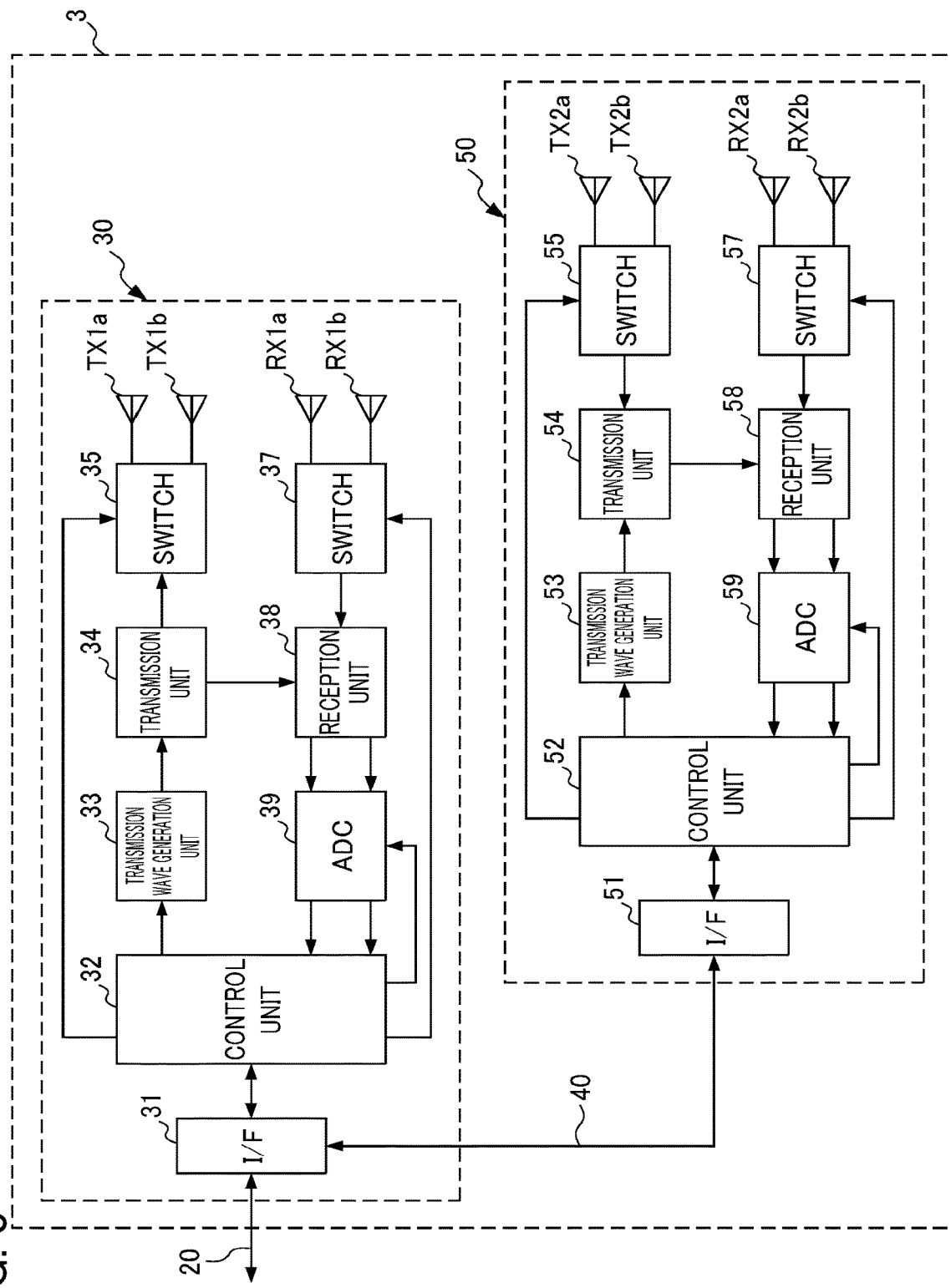
FIG. 3 is a block diagram showing a configuration of a radar apparatus.

A configuration of the radar apparatus 3 will be described herein. FIG. 3 is a block diagram showing the configuration of the radar apparatus 3. Note that the configuration of the first radar apparatus 30 and the configuration of the second radar apparatus 50 are basically the same configuration.

As shown in FIG. 3, the first radar apparatus 30 has an I/F 31, a control unit 32, a transmission wave generation unit 33, a transmission unit 34, a switch 35, transmission antennas TX1a, TX1b, reception antennas RX1a, RX1b, a switch 37, a reception unit 38, and an analog-to-digital converter (ADC) 39. Note that FIG. 3 shows an example where two transmission antennas TX are provided, but the number of transmission antennas TX is not limited to two and may be one or three or more. Moreover, FIG. 3 shows an example where two reception antennas RX are provided, but the number of reception antennas RX is not limited to two and may be one or three or more.

As shown in FIG. 3, the second radar apparatus 50 has an I/F 51, a control unit 52, a transmission wave generation unit 53, a transmission unit 54, a switch 55, transmission antennas TX2a, TX2b, reception antennas RX2a, RX2b, a switch 57, a reception unit 58, an ADC 59. Note that FIG. 3 shows an example where two transmission antennas TX are provided, but the number of transmission antennas TX is not limited to two and may be one or three or more. Moreover, FIG. 3 shows an example where two reception antennas RX are provided, but the number of reception antennas RX is not limited to two and may be one or three or more.

The I/F 31 and the I/F 51 have the same configuration, and therefore, the configuration and operation of the I/F 31 will be described below as a representative example. The control unit 32 and the control unit 52 basically have the same configuration, and therefore, the configuration and operation of the control unit 32 will be described below as representative common contents. The transmission wave generation unit 33 and the transmission wave generation unit 53 have the same configuration, and therefore, the configuration and operation of the transmission wave generation unit 33 will be described below as a representative example.

The transmission unit 34 and the transmission unit 54 have the same configuration, and therefore, the configuration and operation of the transmission unit 34 will be described below as a representative example. The transmission antennas TX1a, TX1b and the transmission antennas TX2a, TX2b have the same configuration, and therefore, the configuration and operation of the transmission antennas TX1a, TX1b will be described below as a representative example. The reception antennas RX1a, RX1b and the reception antennas RX2a, RX2b have the same configuration, and therefore, the configuration and operation of the reception antennas RX1a, RX1b will be described below as a representative example. Note that the second radar apparatus 50 may include a single reception antenna. In the case of this configuration, the information regarding the angle cannot be acquired in the second radar apparatus 50, but the second radar apparatus 50 is less expensive than the first radar apparatus 30. The switch 35 and the switch 55 have the same configuration, and therefore, the configuration and operation of the switch 35 will be described below as a representative example. The switch 37 and the switch 57 have the same configuration, and therefore, the configuration and operation of the switch 37 will be described below as a representative example. Note that in a case where the second radar apparatus 50 includes the single reception antenna, the switch 57 is not necessary.

The reception unit 38 and the reception unit 58 have the same configuration, and therefore, the configuration and operation of the reception unit 38 will be described below as a representative example. The ADC 39 and the ADC 59 have the same configuration, and therefore, the configuration and operation of the ADC 39 will be described below as a representative example.

The I/F 31 is an interface for transmission/reception of the digital data between the first radar apparatus 30 and the central processing unit 10. The I/F 31 described herein is set according to specifications of a connection line 40, and an interface according to the LVDS specifications is used in the present embodiment. However, interfaces other than one according to the LVDS specifications can be also used. The I/F 31 and the I/F 51 are connected to each other via the connection line 40. The control unit 32 receives the information (the second information) supplied from the I/F 51 via the I/F 31.

The control unit 32 controls the transmission wave generation unit 33 to transmit a transmission signal to the target object, and performs predetermined processing for the digital data supplied from the ADC 39 to generate the first information. The control unit 32 performs the arithmetic integration processing based on the first information and the second information received from the second radar apparatus 50 to generate the integrated information. The control unit 32 transmits the integrated information to the central processing unit 10 via the I/F 31. Moreover, the control unit 32 performs, via the I/F 31, digital communication with the central processing unit 10 to synchronize the operation of the first radar apparatus 30. In this manner, both of the timing of operating the first radar apparatus 30 and the timing of transmitting/receiving the transmission signal are controlled. Moreover, the control unit 32 performs, via the I/F 31, digital communication to synchronize the operation of the second radar apparatus 50. Note that synchronization of the operation of the second radar apparatus 50 may be performed by the central processing unit 10.

The transmission wave generation unit 33 generates the transmission signal according to the control by the control unit 32, and supplies the transmission signal to the transmission unit 34. The transmission unit 34 upconverts the transmission signal supplied from the transmission wave generation unit 33 into a predetermined frequency band to supply such a signal to the switch 35. The switch 35 is controlled by the control unit 32, and selects either one of the transmission antenna TX1a or the transmission antenna TX1b. The upconverted transmission signal is transmitted to the target object via the transmission antenna selected by the switch 35. More specifically, the transmission unit 34 can be, for example, configured to upconvert the transmission signal into a quasi-millimeter or millimeter wave band (specifically, 24 GHz to 28 GHz, 76 to 81 GHz, etc.) to emit such a signal from the transmission antenna TX1a, TX1b. Needless to say, frequencies other than above may be employed. The transmission antennas TX1a, TX1b emit a high-frequency signal supplied from the transmission unit 34 to a free space.

The reception antennas RX1a, RX1b are configured such that antennas having similar properties are arranged with a predetermined distance, and receive the reflective wave reflected on the target object to supply the reflective wave to the switch 37.

The switch 37 is controlled by the control unit 32, and selects either one of the reception antenna RX1a or the reception antenna RX1b and supplies a reception signal to the reception unit 38. The reception unit 38 IQ-demodulates the reception signal supplied from the switch 37 to output an I-signal and a Q-signal with phases perpendicular to each other. The ADC 39 is controlled by the control unit 32, and for the I-signal and the Q-signal (analog signals) supplied from the reception unit 38, executes equivalent time sampling for sampling the signals such that the timing of starting sampling is shifted by predetermined time to convert the signals into the digital data and supplies the digital data to the control unit 32. Note that the equivalent time sampling is not necessarily performed, and conversion into the digital data may be performed by normal sampling.

Note that in the above-described configuration, the signal outputted from the reception antenna RX1a, RX1b is selected by the switch 37. For example, the signals outputted from the reception antennas RX1a, RX1b may be converted into a sum signal and a difference signal by a hybrid circuit, and the sum or difference signal may be selected by the switch 37.

The control unit 32 executes target detection processing and angle detection processing for the data supplied from the ADC 39, thereby detecting the presence or absence, the angle, etc. of the target (the target object) included in the data supplied from the ADC 39. Such information regarding the target object is equivalent to the above-described first information. The control unit 32 performs the arithmetic integration processing based on the first information and the second information received from the second radar apparatus 50 to generate the integrated information. The control unit 32 transmits the integrated information to the central processing unit 10 via the I/F 31.

A communication speed between the second radar apparatus 50 and the first radar apparatus 30 (the communication speed of the connection line 40) is equal to or lower than several tens of kbps (e.g., 20 kbps). A communication speed between the first radar apparatus 30 and the higher-level apparatus (the communication speed of the connection line 20) is equal to or lower than several Mbps (e.g., 4 Mbps).

With this configuration, the radar system 1 is configured such that the detection area of the first radar apparatus 30 and the detection area of the second radar apparatus 50 partially overlap with each other and the second radar apparatus 50 is arranged to cover a region that cannot be detected by the first radar apparatus 30, and therefore, an optimal combination of radar apparatuses (e.g., a radar apparatus that detects a target at an intermediate distance (about 2 m to 100 m) and a radar apparatus that detects a target at a short distance (about 0 m to 20 m)) having different detection areas can be realized. Moreover, the radar system 1 transmits the second information generated in the second radar apparatus 50 to the first radar apparatus 30 via the connection line 40, integrates the first information and the second information to generate the integrated information in the first radar apparatus 30, and transmits the generated integrated information to the central processing unit 10 via the connection line 20. Thus, the information processing efficiency of the entirety of the system can be enhanced.

(Case of Including a Plurality of Second Radar Apparatuses)

The second radar apparatus 50 may include a plurality of second radar apparatuses 50. The first radar apparatus 30 performs the arithmetic integration processing based on the first information generated by the first radar apparatus 30 itself and multiple pieces of second information transmitted from the plurality of second radar apparatuses 50 to generate the integrated information, and transmits the integrated information to the higher-level apparatus.

Figure 4:
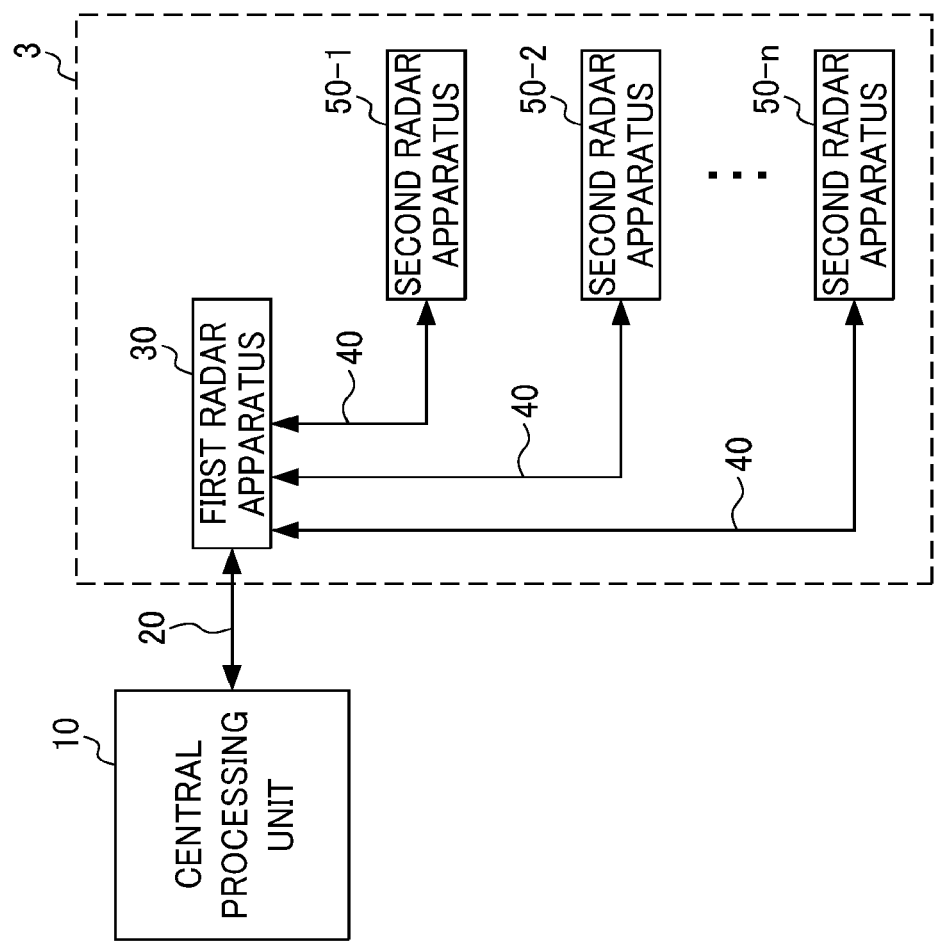
FIG. 4 is a block diagram showing a configuration of a radar apparatus including a plurality of second radar apparatuses.

FIG. 4 is a block diagram showing the configuration of the radar apparatus 3 including the plurality of second radar apparatuses 50-1 to 50-n.

The first radar apparatus 30 and the plurality of second radar apparatuses 50-1 to 50-n are arranged on the vehicle such that the detection area of the first radar apparatus 30 and the detection area of each of the plurality of second radar apparatuses 50-1 to 50-*n* partially overlap with each other and the plurality of second radar apparatuses 50-1 to 50-*n* covers the region that cannot be detected by the first radar apparatus 30.

Moreover, the plurality of second radar apparatuses 50-1 to 50-*n* transmits the second information generated in each of the second radar apparatuses 50-1 to 50-*n* to the first radar apparatus 30 via the connection line 40. The first radar apparatus 30 integrates the first information and the multiple pieces of second information to generate the integrated information, and transmits the generated integrated information to the central processing unit 10 via the connection line 20.

Thus, in a case where the second radar apparatus 50 includes the plurality of second radar apparatuses 50 in the radar system 1, an optimal combination of radar apparatuses (e.g., a radar apparatus that detects a target at an intermediate distance (about 2 m to 100 m) and a radar apparatus that detects a target at a short distance (about 0 m to 20 m)) having different detection areas can be realized. Further, the radar system 1 performs, in the first radar apparatus 30, the integration processing for the second information generated in the second radar apparatuses 50-1 to 50-*n*, and therefore, can reduce a processing burden on the second radar apparatuses 50-1 to 50-*n*. In addition, the radar system 1 integrates the integrated information of the second information and the first information in the first radar apparatus 30 and transmits such integrated information to the central processing unit 10, and therefore, can reduce a processing burden on the central processing unit 10. Thus, the information processing efficiency of the entire system can be enhanced.

(Case of Including a Plurality of First Radar Apparatuses)

The first radar apparatus 30 may include a plurality of first radar apparatuses 30. The first radar apparatus 30 that is one of the plurality of first radar apparatuses 30 is a master. The first radar apparatus 30 as the master performs the arithmetic integration processing based on the information generated by the master first radar apparatus 30 itself and the information transmitted from the other first radar apparatuses 30 to generate the integrated information, and transmits the integrated information to the higher-level apparatus.

Figure 5:
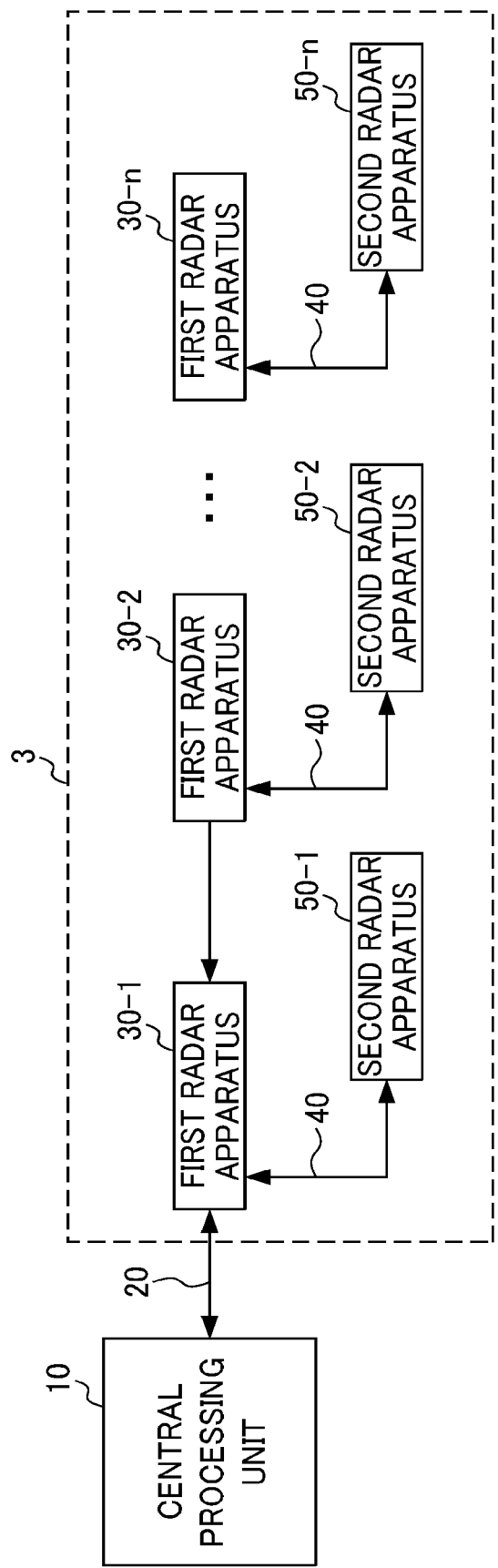
FIG. 5 is a block diagram showing a configuration of a radar apparatus including a plurality of first radar apparatuses.

FIG. 5 is a block diagram showing the configuration of the radar apparatus 3 including the plurality of first radar apparatuses 30-1 to 30-*n*. Note that FIG. 5 shows an example where the single second radar apparatus 50 is connected to each of the first radar apparatuses 30-1 to 30-*n*, but the present disclosure is not limited to this example. The plurality of second radar apparatuses 50 may be connected to each of the first radar apparatuses 30-1 to 30-*n*.

The plurality of first radar apparatuses 30-1 to 30-*n* and the plurality of second radar apparatuses 50-1 to 50-*n* are arranged on the vehicle such that the detection areas of the plurality of first radar apparatuses 30-1 to 30-*n* and the detection areas of the plurality of second radar apparatuses 50-1 to 50-*n* partially overlap with each other and the second radar apparatuses 50 cover the regions that cannot be detected by the first radar apparatuses 30.

In the case of the present embodiment, the first radar apparatus 30-1 is set as the master, and the other first radar apparatuses 30-2 to 30-*n* are set as slaves.

Each of the second radar apparatuses 50-1 to 50-*n* transmits, via the connection line 40, the second information generated in such a second radar apparatus 50 to the first radar apparatus 30 directly connected to such a second radar apparatus 50. Moreover, each of the multiple pieces of second information generated in the second radar apparatuses 50-1 to 50-*n* is transmitted to the first radar apparatus 30 responsible for the integration processing. For example, in a case where the first radar apparatus 30-*n* is responsible for the integration processing for the multiple pieces of second information, all pieces of second information are transmitted to the first radar apparatus 30-*n*.

Each of the first radar apparatuses 30-2 to 30-*n* set as the slaves transmits the first information generated in such a first radar apparatus 30 itself to the first radar apparatus 30-1 set as the master via the connection line 20. Moreover, the integrated information obtained by the integration processing for the multiple pieces of second information is also transmitted to the first radar apparatus 30-1 set as the master.

The first radar apparatus 30-1 set as the master integrates the first information generated in the first radar apparatus 30-1 itself, the first information transmitted from the other first radar apparatuses 30-2 to 30-*n*, and the integrated information obtained by the integration processing for the multiple pieces of second information to generate the integrated information, and transmits the generated integrated information to the central processing unit 10.

Thus, in a case where the first radar apparatus 30 includes the plurality of first radar apparatuses 30 and one or more second radar apparatuses 50 are connected to each first radar apparatus 30 in the radar system 1, an optimal combination of radar apparatuses (e.g., a radar apparatus that detects a target at an intermediate distance (about 2 m to 100 m) and a radar apparatus that detects a target at a short distance (about 0 m to 20 m)) having different detection areas can be realized. Further, the radar system 1 performs the integration processing for the second information generated in the second radar apparatuses 50-1 to 50-*n* in the first radar apparatus 30 as the master, and therefore, can reduce the processing burden on the second radar apparatuses 50-1 to 50-*n*. In addition, the radar system 1 performs, in the first radar apparatus 30 as the master, the integration processing for the first information generated in the other first radar apparatuses 30, the integrated information of the second information, and the first information generated in the master first radar apparatus 30 itself, and transmits such integrated information to the central processing unit 10. Thus, the radar system 1 can reduce the processing burden on the central processing unit 10. Consequently, the information processing efficiency of the entire system can be enhanced.

(First Configuration Example of Radar System)

Figure 6:
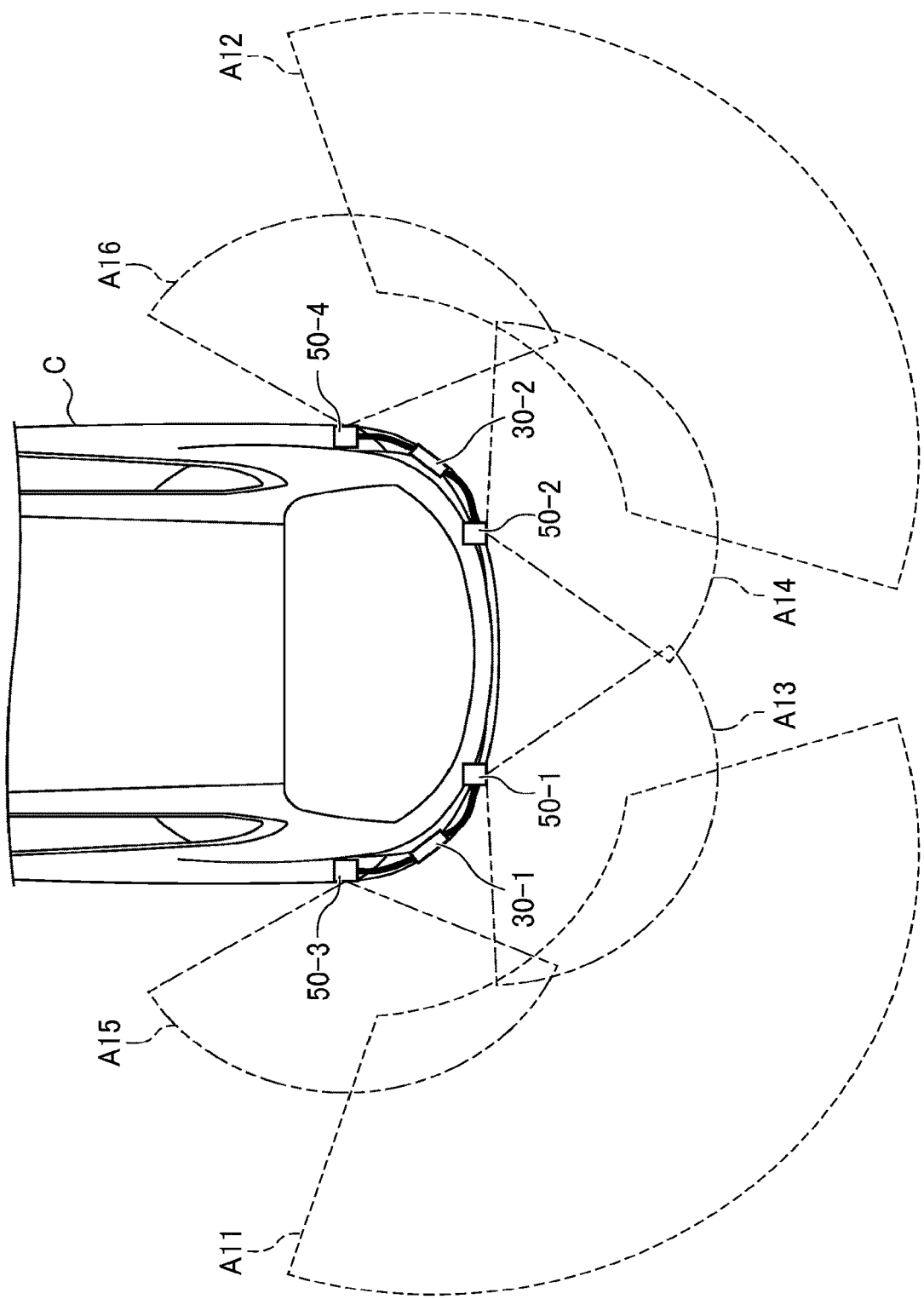
FIG. 6 is a view showing a first configuration example of the radar system.
Figure 7:
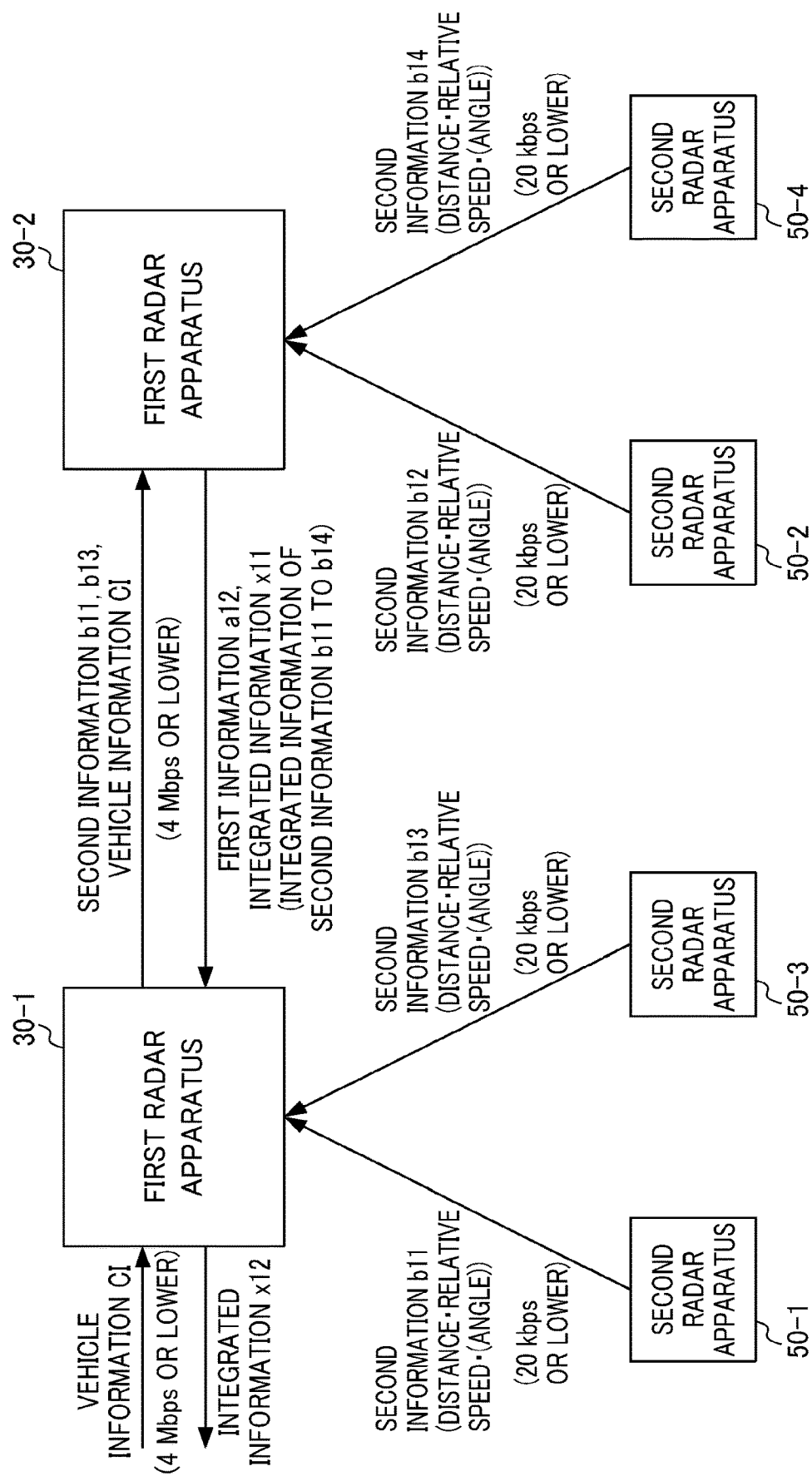
FIG. 7 is a block diagram showing the configuration of the radar system illustrated in FIG. 6.

A first configuration example of the radar system 1 will be described herein. FIG. 6 is a view showing the first configuration example of the radar system 1. FIG. 7 is a block diagram showing the configuration of the radar system 1 illustrated in FIG. 6. As shown in FIG. 6, in the radar system 1, a first radar apparatus 30-1 having a detection area A11, a first radar apparatus 30-2 having a detection area A12, a second radar apparatus 50-1 having a detection area A13, a second radar apparatus 50-2 having a detection area A14, a second radar apparatus 50-3 having a detection area A15, and a second radar apparatus 50-4 having a detection area A16 are arranged on the vehicle C.

Moreover, the first radar apparatus 30-1 and the second radar apparatuses 50-1, 50-3 are arranged in a left rear bumper of the vehicle C such that the detection area of the first radar apparatus 30-1 and the detection area of each of the second radar apparatuses 50-1, 50-3 partially overlap with each other and the second radar apparatuses 50-1, 50-3 cover a region that cannot be detected by the first radar apparatus 30-1.

Further, the first radar apparatus 30-2 and the second radar apparatuses 50-2, 50-4 are arranged in a right rear bumper of the vehicle C such that the detection area of the first radar apparatus 30-2 and the detection area of each of the second radar apparatuses 50-2, 50-4 partially overlap with each other and the second radar apparatuses 50-2, 50-4 cover a region that cannot be detected by the first radar apparatus 30-2.

For example, the first radar apparatus 30-1 generates first information (a distance to a target and a speed and an angle relative to the target) a11 regarding the target, targeting for an intermediate distance (about 2 m to 100 m). Moreover, the first radar apparatus 30-1 integrates the first information a11 generated in the first radar apparatus 30-1 itself, first information a1t transmitted from the first radar apparatus 30-2, and integrated information x11 obtained by integration of all pieces of second information, and executes arithmetic processing (arithmetic target processing) for specifying the target to generate integrated information x12. The first radar apparatus 30-1 transmits the integrated information x12 to the central processing unit 10.

For example, the first radar apparatus 30-2 generates the first information (the distance to the target and the speed and the angle relative to the target) a1t regarding the target, targeting for the intermediate distance (about 2 m to 100 m). Moreover, the first radar apparatus 30-2 integrates all pieces of second information b11, b12, b13, b14, and executes the arithmetic processing (the arithmetic target processing) for specifying the target to generate the integrated information x11. The first radar apparatus 30-2 transmits the first information a12 generated in the first radar apparatus 30-2 itself and the integrated information x11 to the first radar apparatus 30-1.

For example, the second radar apparatus 50-1 generates the second information (the distance to the target and the speed relative to the target) b11 regarding the target, targeting for a short distance (about 0 m to 20 m). Note that the second radar apparatus 50-1 may include a plurality of reception antennas. In the case of this configuration, the information indicating the angle is also included in the second information. The second radar apparatus 50-1 transmits the second information b11 to the first radar apparatus 30-1. The first radar apparatus 30-1 transmits the second information b11 to the first radar apparatus 30-2.

For example, the second radar apparatus 50-3 generates the second information (the distance to the target and the speed relative to the target) b13 regarding the target, targeting for the short distance (about 0 m to 20 m). Note that the second radar apparatus 50-3 may include a plurality of reception antennas. In the case of this configuration, the information indicating the angle is also included in the second information. The second radar apparatus 50-3 transmits the second information b13 to the first radar apparatus 30-1. The first radar apparatus 30-1 transmits the second information b13 to the first radar apparatus 30-2.

For example, the second radar apparatus 50-2 generates the second information (the distance to the target and the speed relative to the target) b12 regarding the target, targeting for the short distance (about 0 m to 20 m). Note that the second radar apparatus 50-2 may include a plurality of reception antennas. In the case of this configuration, the information indicating the angle is also included in the second information. The second radar apparatus 50-2 transmits the second information b12 to the first radar apparatus 30-2.

For example, the second radar apparatus 50-4 generates the second information (the distance to the target and the speed relative to the target) b14 regarding the target, targeting for the short distance (about 0 m to 20 m). Note that the second radar apparatus 50-4 may include a plurality of reception antennas. In the case of this configuration, the information indicating the angle is also included in the second information. The second radar apparatus 50-4 transmits the second information b14 to the first radar apparatus 30-2.

Figure 8:
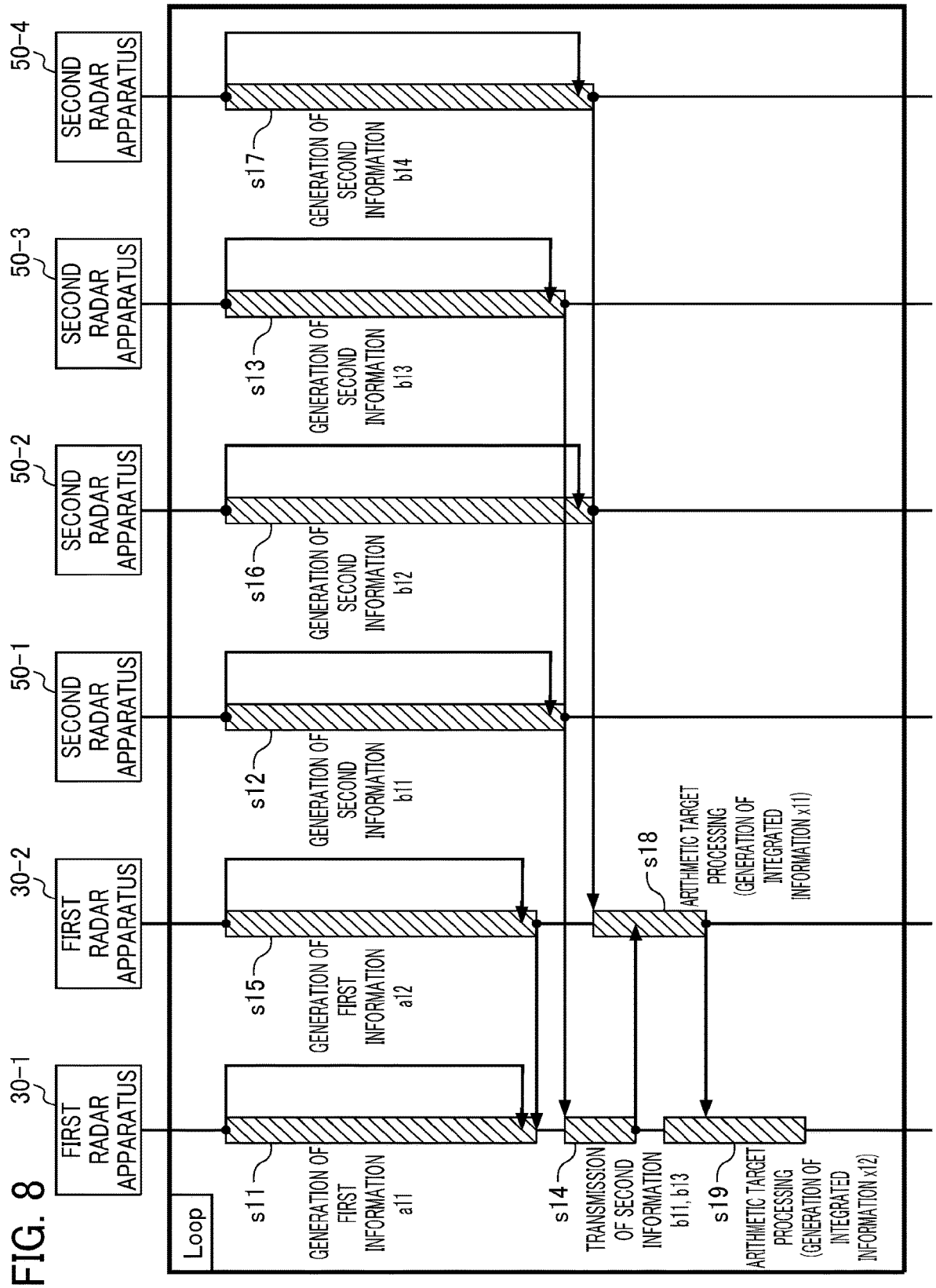
FIG. 8 is a chart provided for describing a flow of a processing of the radar system according to the first configuration example.

Next, the flow of the processing of the radar system 1 according to the above-described first configuration example will be described. FIG. 8 is a chart provided for describing the flow of the processing of the radar system 1 according to the first configuration example.

At Step S11, the first radar apparatus 30-1 generates the first information (the distance to the target and the speed and the angle relative to the target) a11 regarding the target, and receives the first information a12 transmitted from the first radar apparatus 30-2.

At Step S12, the second radar apparatus 50-1 generates the second information (the distance to the target and the speed relative to the target) b11 regarding the target, and transmits the generated second information b11 to the first radar apparatus 30-1.

At Step S13, the second radar apparatus 50-3 generates the second information (the distance to the target and the speed relative to the target) b13 regarding the target, and transmits the generated second information b13 to the first radar apparatus 30-1.

At Step S14, the first radar apparatus 30-1 receives the second information b11 transmitted from the second radar apparatus 50-1 and the second information b13 transmitted from the second radar apparatus 50-3, and transmits the second information b11, b13 to the first radar apparatus 30-2. Moreover, the first radar apparatus 30-1 transmits vehicle information received from the central processing unit 10 to the first radar apparatus 30-2.

At Step S15, the first radar apparatus 30-2 generates the first information (the distance to the target and the speed and the angle relative to the target) a1t regarding the target, and transmits the generated first information a12 to the first radar apparatus 30-1.

At Step S16, the second radar apparatus 50-2 generates the second information (the distance to the target and the speed relative to the target) b12 regarding the target, and transmits the generated second information b12 to the first radar apparatus 30-2.

At Step S17, the second radar apparatus 50-4 generates the second information (the distance to the target and the speed relative to the target) b14 regarding the target, and transmits the generated second information b14 to the first radar apparatus 30-2.

At Step S18, the first radar apparatus 30-2 receives the second information b11, b13 transmitted from the first radar apparatus 30-1, the second information b12 transmitted from the second radar apparatus 50-2, and the second information b14 transmitted from the second radar apparatus 50-4, integrates the second information b11 to b14, and executes the arithmetic processing (the arithmetic target processing) for specifying the target to generate the integrated information x11. Moreover, the first radar apparatus 30-2 transmits the generated integrated information x11 to the first radar apparatus 30-1.

At Step S19, the first radar apparatus 30-1 receives the integrated information x11 transmitted from the second radar apparatus 50-2, integrates the first information a11 generated in the first radar apparatus 30-1 itself, the first information a12 transmitted from the first radar apparatus 30-2, and the integrated information x11, and executes the arithmetic processing (the arithmetic target processing) for specifying the target to generate the integrated information x12. Thereafter, the first radar apparatus 30-1 transmits the integrated information x12 to the central processing unit 10.

The radar system 1 repeatedly performs the above-described processing of Steps S11 to S19 (loop processing).

As described above, the radar system 1 is arranged such that the detection area of the first radar apparatus 30-1 and the detection areas of the second radar apparatuses 50-1, 50-3 partially overlap with each other and the second radar apparatuses 50-1, 50-3 cover the region that cannot be detected by the first radar apparatus 30-1, and is arranged such that the detection area of the first radar apparatus 30-2 and the detection areas of the second radar apparatuses 50-2, 50-4 partially overlap with each other and the second radar apparatuses 50-2, 50-4 cover the region that cannot be detected by the first radar apparatus 30-2. Thus, an optimal combination of radar apparatuses having different detection areas can be realized. Moreover, the radar system 1 transmits the second information generated in the second radar apparatuses 50-1 to 50-4 to the first radar apparatus 30-2 via the connection line 40, integrates all pieces of second information to generate the integrated information x11 in the first radar apparatus 30-2, integrates the first information a11, a12 and the integrated information x11 to generate the integrated information x12 in the first radar apparatus 30-1, and transmits the generated integrated information x12 to the central processing unit 10 via the connection line 20. Thus, the information processing efficiency of the entire system can be enhanced.

Further, it is not necessary to mount an integration processing unit that generates the integrated information on the second radar apparatuses 50-1 to 50-4, and therefore, a radar system installation cost can be reduced.

In addition, it may only be required that only the second information is transmitted from the second radar apparatus 50 to the first radar apparatus 30, and therefore, the communication speed between the second radar apparatus 50 and the first radar apparatus 30 (the communication speed of the connection line 40) can be equal to or lower than several tens of kbps.

Note that the example where the radar system 1 (the first radar apparatuses 30-1, 30-2 and the second radar apparatuses 50-1 to 50-4) is arranged on the rear side of the vehicle C has been described above, but the present disclosure is not limited to above. The radar system 1 may be arranged on a front side of the vehicle C, or may be arranged on both of the front side and the rear side of the vehicle C.

(Second Configuration Example of Radar System)

Figure 9:
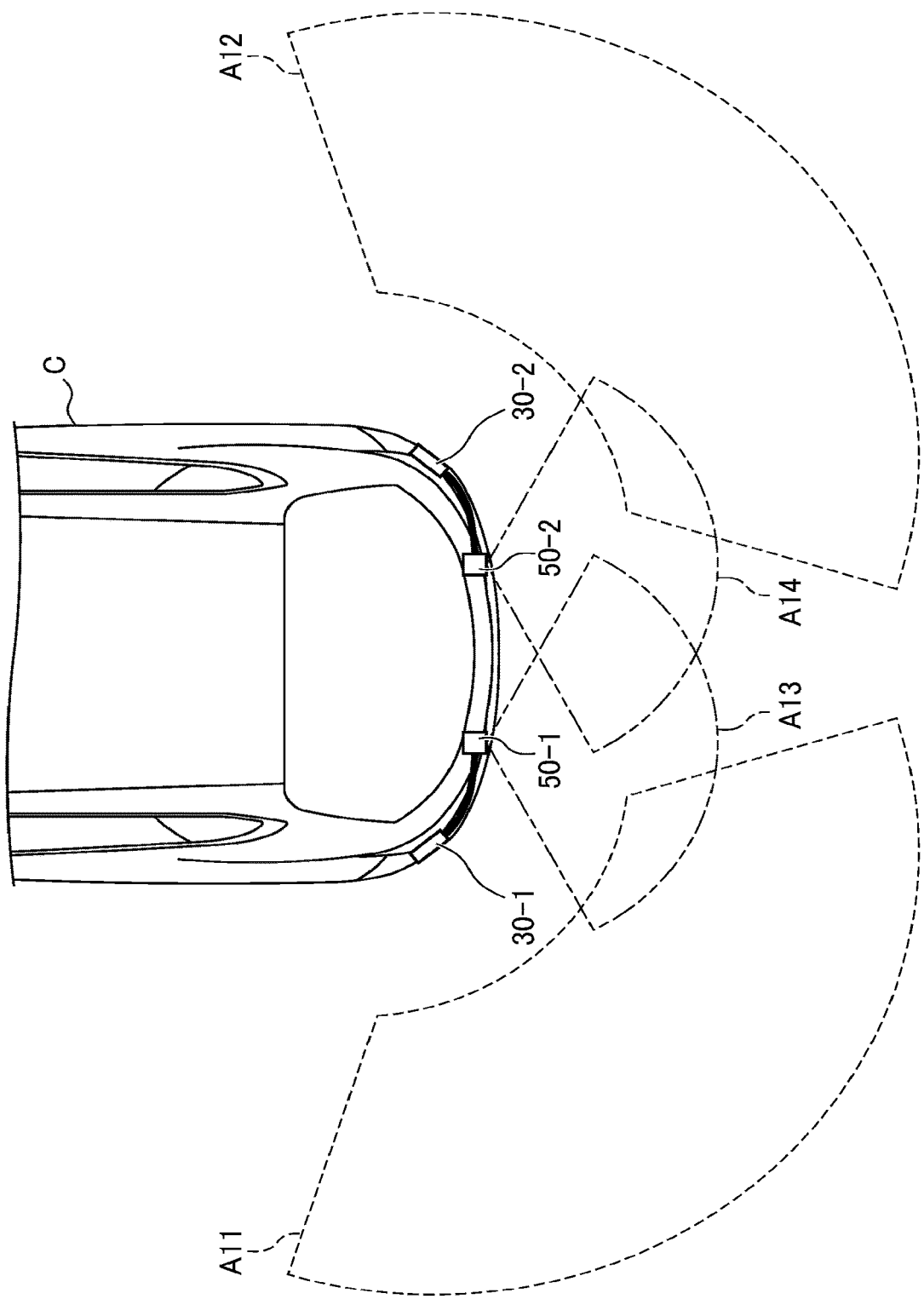
FIG. 9 is a view showing a second configuration example of the radar system.
Figure 10:
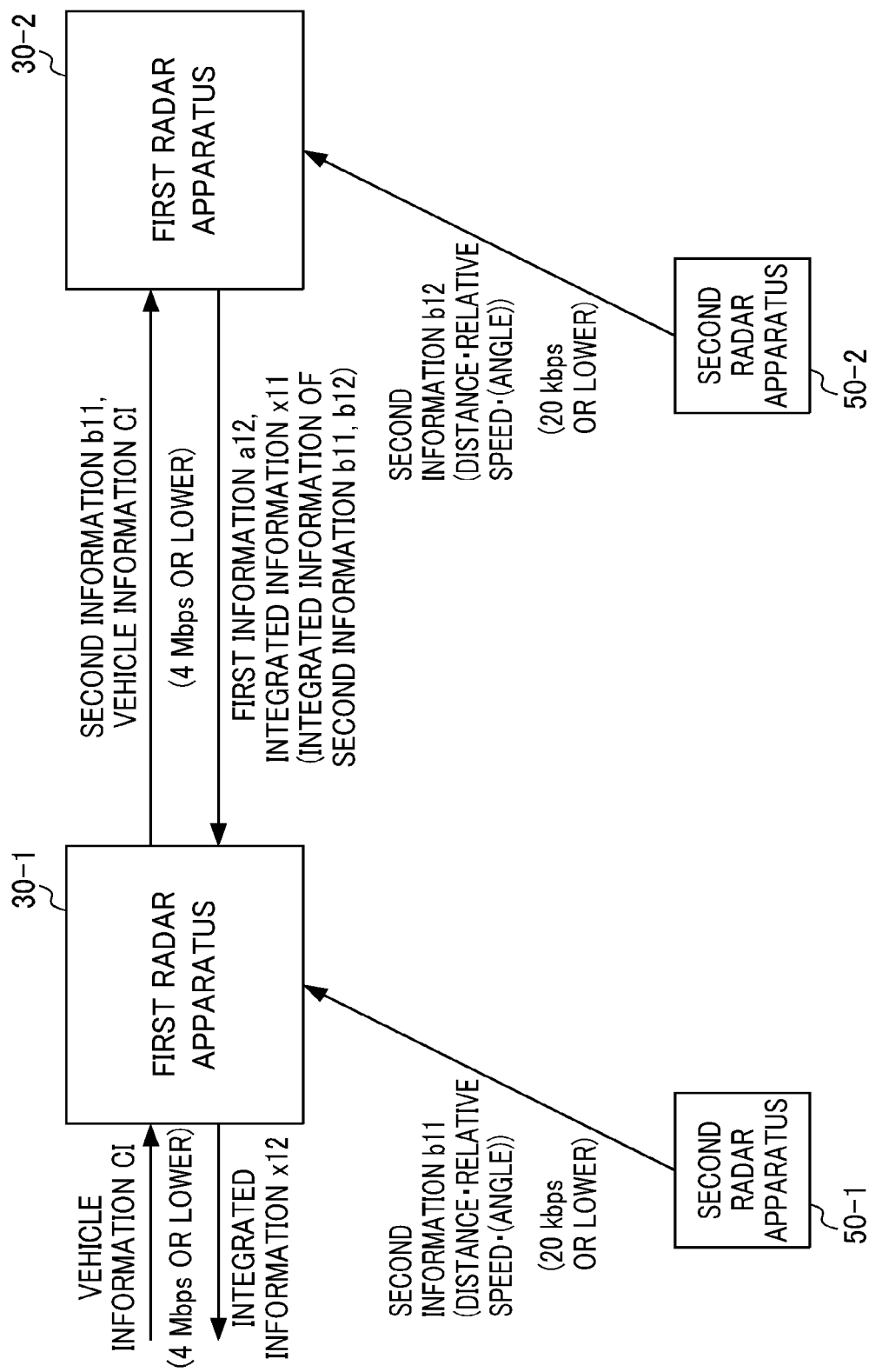
FIG. 10 is a block diagram showing the configuration of the radar system illustrated in FIG. 9.

A second configuration example of the radar system 1 will be described herein. FIG. 9 is a view showing the second configuration example of the radar system 1. FIG. 10 is a block diagram showing the configuration of the radar system 1 illustrated in FIG. 9. In the second configuration example of the radar system 1, the first radar apparatus 30-1 having the detection area A11, the first radar apparatus 30-2 having the detection area A12, the second radar apparatus 50-1 having the detection area A13, and the second radar apparatus 50-2 having the detection area A14 are arranged on the vehicle C.

The first radar apparatus 30-1 and the second radar apparatus 50-1 are arranged in the left rear bumper of the vehicle C such that the detection area of the first radar apparatus 30-1 and the detection area of the second radar apparatus 50-1 partially overlap with each other and the second radar apparatus 50-1 covers the region that cannot be detected by the first radar apparatus 30-1.

Moreover, the first radar apparatus 30-2 and the second radar apparatus 50-2 are arranged in the right rear bumper of the vehicle C such that the detection area of the first radar apparatus 30-2 and the detection area of the second radar apparatus 50-2 partially overlap with each other and the second radar apparatus 50-2 covers the region that cannot be detected by the first radar apparatus 30-2.

The second configuration example is the same as the first configuration example, except that the second radar apparatus 50-3 and the second radar apparatus 50-4 are not arranged on the vehicle C. Note that the configuration and operation of the first radar apparatuses 30-1, 30-2 and the configuration and operation of the second radar apparatuses 50-1, 50-2 are the same as those of the first configuration example, and therefore, detailed description will be omitted.

Figure 11:
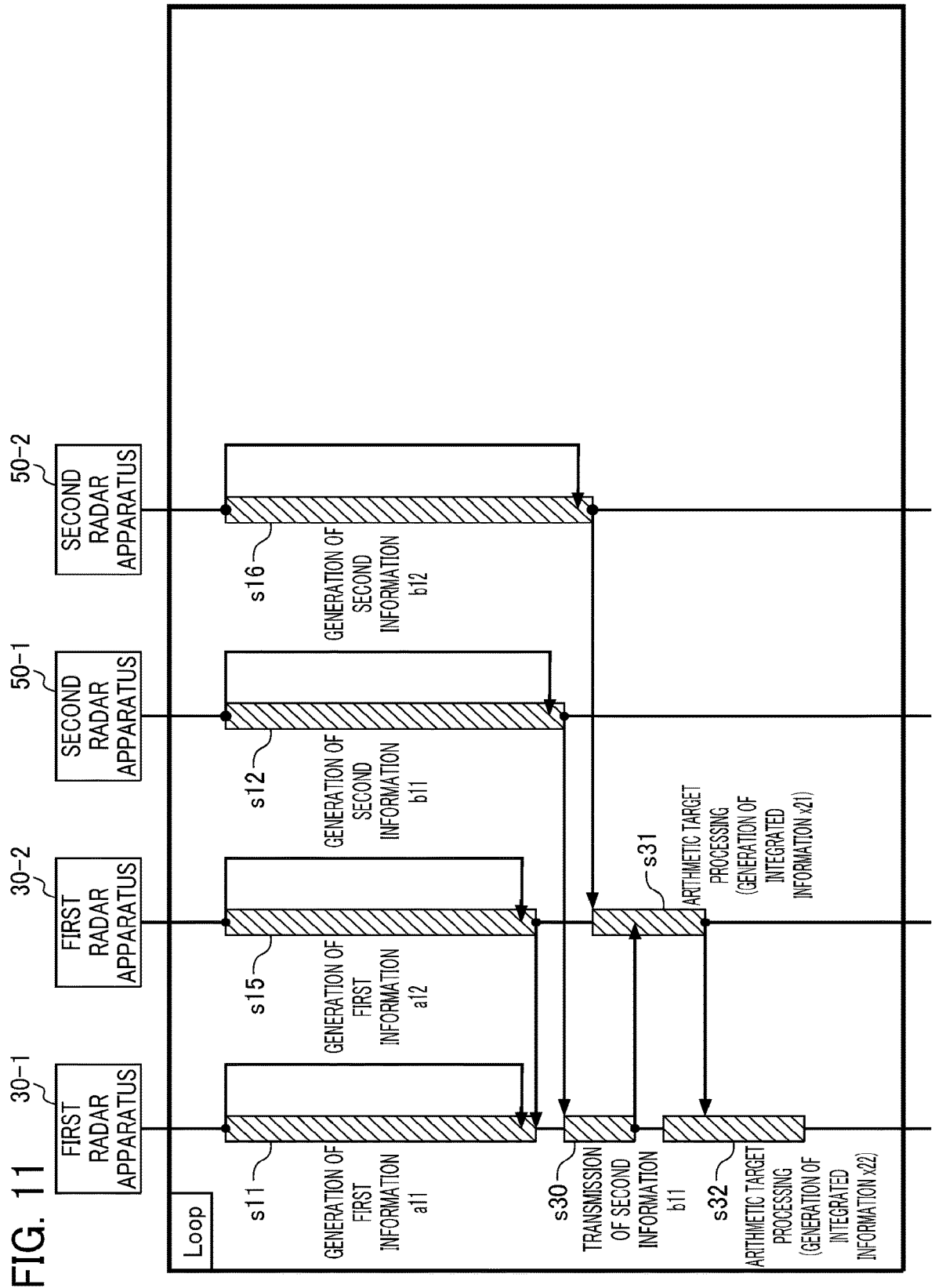
FIG. 11 is a chart provided for describing a flow of a processing of the radar system according to the second configuration example.

Next, the flow of the processing of the radar system 1 according to the above-described second configuration example will be described. FIG. 11 is a chart provided for describing the flow of the processing of the radar system 1 according to the second configuration example. Note that the same number is used to represent the same processing as the processing of the radar system 1 according to the first configuration example described with reference to FIG. 8, and description thereof will be omitted. Steps S11, S12, S15, S16 are the same processing as that of the steps of the first configuration example.

At Step S30, the first radar apparatus 30-1 receives the second information b11 transmitted from the second radar apparatus 50-1, and transmits the second information b11 to the first radar apparatus 30-2.

At Step S31, the first radar apparatus 30-2 receives the second information b11 transmitted from the first radar apparatus 30-1 and the second information b12 transmitted from the second radar apparatus 50-2, integrates the second information b11, b12, and executes the arithmetic processing (the arithmetic target processing) for specifying the target to generate integrated information x21. The first radar apparatus 30-2 transmits the generated integrated information x21 to the first radar apparatus 30-1.

At Step S32, the first radar apparatus 30-1 receives the integrated information x21 transmitted from the first radar apparatus 30-2, integrates the first information a11 generated in the first radar apparatus 30-1 itself, the first information a12 transmitted from the first radar apparatus 30-2, and the integrated information x21, and executes the arithmetic processing (the arithmetic target processing) for specifying the target to generate integrated information x22. Thereafter, the first radar apparatus 30-1 transmits the integrated information x22 to the central processing unit 10.

The radar system 1 repeatedly performs the processing of Steps S11, S12, S15, S16, S30 to S32 (the loop processing).

As described above, the radar system 1 is arranged such that the detection area of the first radar apparatus 30-1 and the detection area of the second radar apparatus 50-1 partially overlap with each other and the second radar apparatus 50-1 covers the region that cannot be detected by the first radar apparatus 30-1, and is arranged such that the detection area of the first radar apparatus 30-2 and the detection area of the second radar apparatus 50-2 partially overlap with each other and the second radar apparatus 50-2 covers the region that cannot be detected by the first radar apparatus 30-2. Thus, an optimal combination of radar apparatuses having different detection areas can be realized. Moreover, the radar system 1 transmits the second information generated in the second radar apparatuses 50-1, 50-2 to the first radar apparatus 30-2 via the connection line 40, integrates all pieces of second information to generate the integrated information x21 in the first radar apparatus 30-2, integrates the first information a11, a12 and the integrated information x21 to generate the integrated information x22 in the first radar apparatus 30-1, and transmits the generated integrated information x22 to the central processing unit 10 via the connection line 20. Thus, the information processing efficiency of the entire system can be enhanced.

Further, it is not necessary to mount the integration processing unit that generates the integrated information on the second radar apparatuses 50-1, 50-2, and therefore, the radar system installation cost can be reduced.

In addition, it may only be required that only the second information is transmitted from the second radar apparatus 50 to the first radar apparatus 30, and therefore, the communication speed between the second radar apparatus 50 and the first radar apparatus 30 (the communication speed of the connection line 40) can be equal to or lower than several tens of kbps.

Note that the example where the radar system 1 (the first radar apparatuses 30-1, 30-2 and the second radar apparatuses 50-1, 50-2) is arranged on the rear side of the vehicle C has been described above, but the present disclosure is not limited to above. The radar system 1 may be arranged on the front side of the vehicle C, or may be arranged on both of the front side and the rear side of the vehicle C.

(Third Configuration Example of Radar System)

Figure 12:
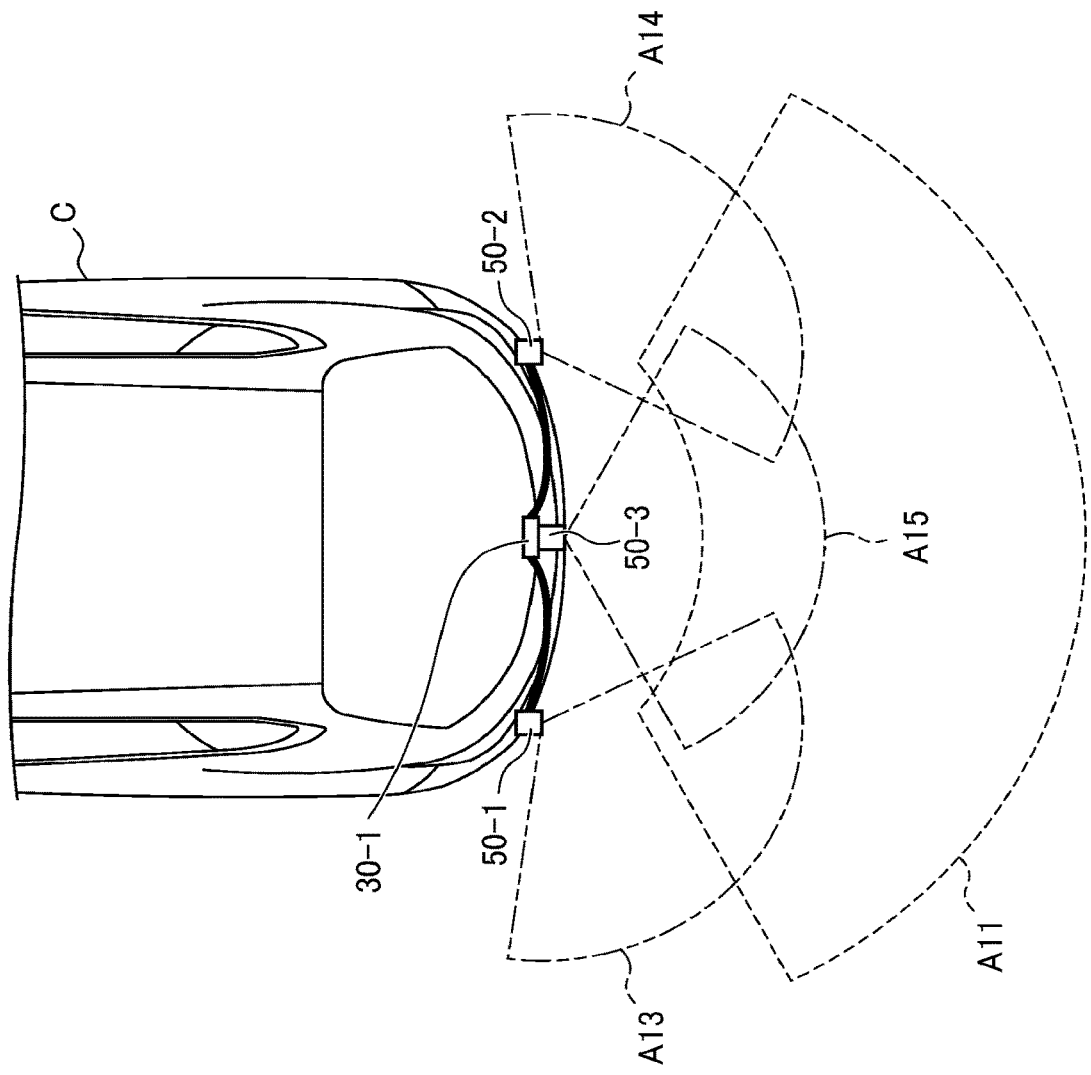
FIG. 12 is a view showing a third configuration example of the radar system.
Figure 13:
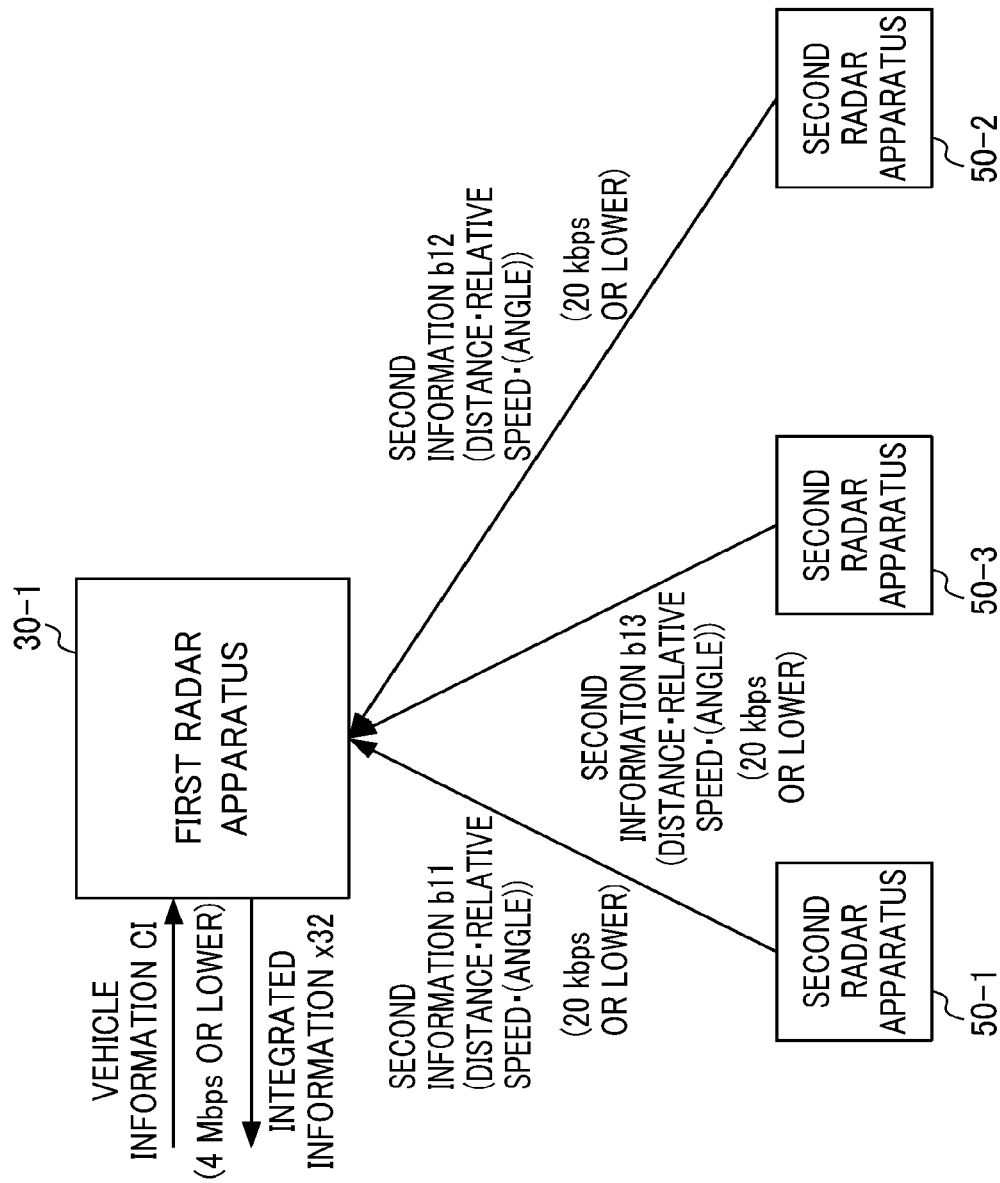
FIG. 13 is a block diagram showing the configuration of the radar system illustrated in FIG. 12.

A third configuration example of the radar system 1 will be described herein. FIG. 12 is a view showing the third configuration example of the radar system 1. FIG. 13 is a block diagram showing the configuration of the radar system 1 illustrated in FIG. 12. In the third configuration example of the radar system 1, the first radar apparatus 30-1 having the detection area A11, the second radar apparatus 50-1 having the detection area A13, the second radar apparatus 50-2 having the detection area A14, and the second radar apparatus 50-3 having the detection area A15 are arranged on the vehicle C.

The first radar apparatus 30-1 is arranged in a vicinity of a center in the rear bumper of the vehicle C and the second radar apparatuses 50-1, 50-2 are arranged on the right and left sides in the rear bumper of the vehicle C such that the detection area of the first radar apparatus 30-1, the detection area of the second radar apparatus 50-1, and the detection area of the second radar apparatus 50-2 partially overlap with each other and the second radar apparatuses 50-1, 50-2 cover the region that cannot be detected by the first radar apparatus 30-1.

Moreover, the second radar apparatus 50-3 is arranged in the vicinity of the center in the rear bumper of the vehicle C to cover regions that cannot be detected by the second radar apparatuses 50-1, 50-2.

Note that the configuration and operation of the first radar apparatus 30-1 and the configuration and operation of the second radar apparatuses 50-1, 50-2, 50-3 are the same as those of the first configuration example and the second configuration example, and therefore, detailed description thereof will be omitted.

Figure 14:
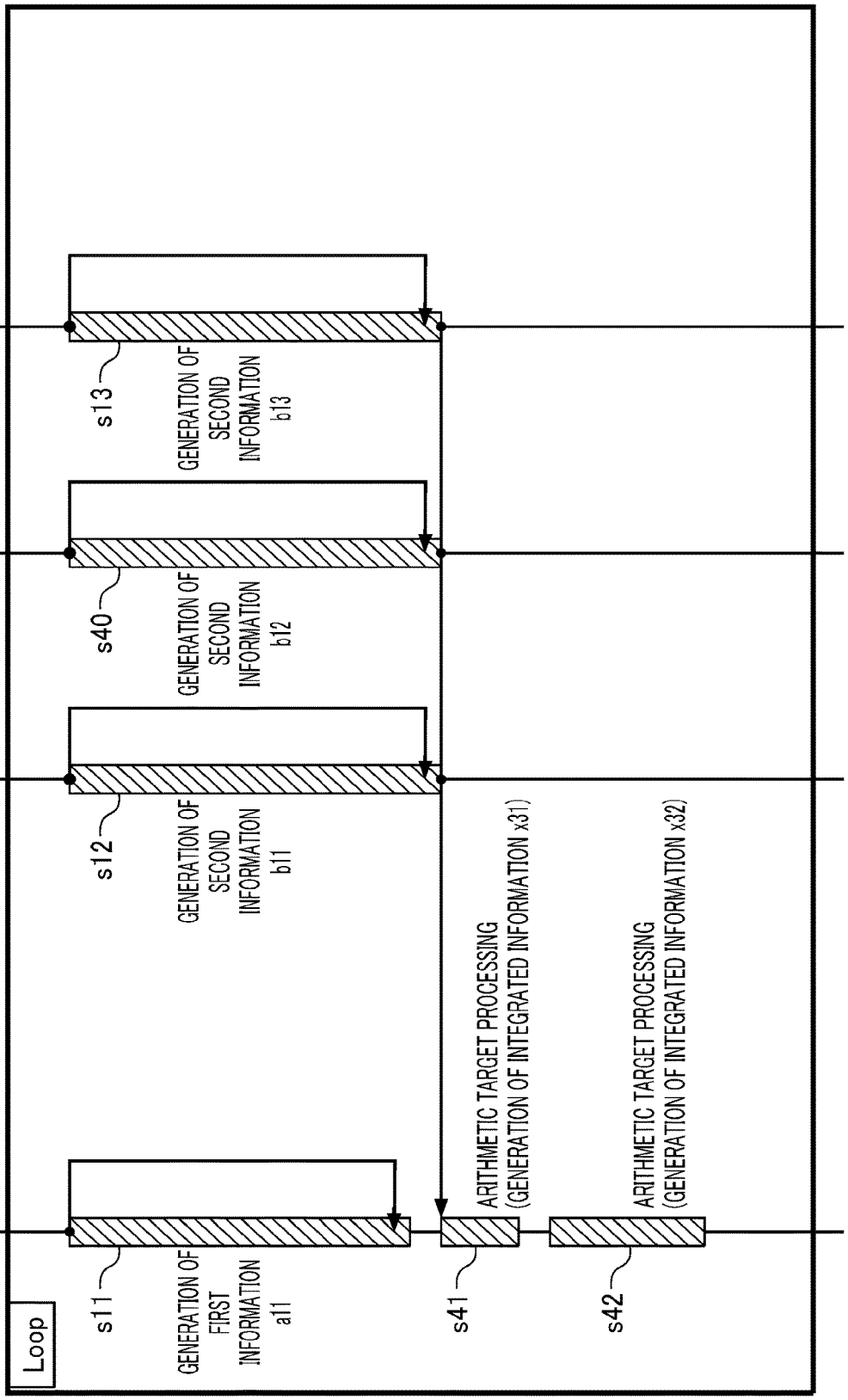
FIG. 14 is a chart provided for describing a flow of a processing of the radar system according to the third configuration example.

Next, the flow of the processing of the radar system 1 according to the above-described third configuration example will be described. FIG. 14 is a chart provided for describing the flow of the processing of the radar system 1 according to the third configuration example. Note that the same number is used to represent the same processing as the processing of the radar system 1 according to the first configuration example described with reference to FIG. 8, and description thereof will be omitted. Steps S11 to S13 are the same processing as that of the steps of the first configuration example.

At Step S40, the second radar apparatus 50-2 generates the second information (the distance to the target and the speed relative to the target) b12 regarding the target, and transmits the generated second information b12 to the first radar apparatus 30-1.

At Step S41, the first radar apparatus 30-1 receives the second information b12 transmitted from the second radar apparatus 50-2, integrates the second information b11, b12, b13, and executes the arithmetic processing (the arithmetic target processing) for specifying the target to generate integrated information x31.

At Step S42, the first radar apparatus 30-1 integrates the first information a11 generated in the first radar apparatus 30-1 itself and the integrated information x31, and executes the arithmetic processing (the arithmetic target processing) for specifying the target to generate integrated information x32. Thereafter, the first radar apparatus 30-1 transmits the integrated information x32 to the central processing unit 10.

The radar system 1 repeatedly performs the processing of Steps S11 to S13, S40 to S42 (the loop processing).

As described above, the radar system 1 is arranged such that the detection area of the first radar apparatus 30-1 and the detection areas of the second radar apparatuses 50-1, 50-2 partially overlap with each other and the second radar apparatuses 50-1, 50-2 cover the region that cannot be detected by the first radar apparatus 30-1, and is arranged such that the second radar apparatus 50-3 covers the regions that cannot be detected by the second radar apparatuses 50-1, 50-2. Thus, an optimal combination of radar apparatuses having different detection areas can be realized.

Moreover, the radar system 1 transmits the second information generated in the second radar apparatuses 50-1, 50-2, 50-3 to the first radar apparatus 30-1 via the connection line 40, integrates all pieces of second information to generate the integrated information x31 and integrates the integrated information x31 and the first information a11 to generate the integrated information x32 in the first radar apparatus 30-1, and transmits the generated integrated information x32 to the central processing unit 10 via the connection line 20. Thus, the information processing efficiency of the entire system can be enhanced.

Further, it is not necessary to mount the integration processing unit that generates the integrated information on the second radar apparatuses 50-1, 50-2, 50-3, and therefore, the radar system installation cost can be reduced.

In addition, it may only be required that only the second information is transmitted from the second radar apparatus 50 to the first radar apparatus 30, and therefore, the communication speed between the second radar apparatus 50 and the first radar apparatus 30 (the communication speed of the connection line 40) can be equal to or lower than several tens of kbps.

Note that the example where the radar system 1 (the first radar apparatus 30-1 and the second radar apparatuses 50-1, 50-2, 50-3) is arranged on the rear side of the vehicle C has been described above, but the present disclosure is not limited to above. The radar system 1 may be arranged on the front side of the vehicle C, or may be arranged on both of the front side and the rear side of the vehicle C.

The radar system 1 is not limited to the above-described first to third configuration examples, and various configuration examples are conceivable.

The radar system 1 according to the present embodiment can use one or more second radar apparatuses 50 as a replacement for an apparatus (an ultrasonic sensor) that emits an ultrasonic wave to a target and measures a distance to the target based on time until a reflective wave returns, for example. In this case, the step of opening a hole at the bumper to arrange the ultrasonic sensor and the step of providing, at the bumper, a bezel closing the hole and protecting the ultrasonic sensor can be omitted, and the number of steps of manufacturing the vehicle can be reduced. The bezel is coated in the same type of color as that of the bumper to be less noticeable, but is visible because it is difficult to form the bezel in the same color as that of the bumper. In a case where one or more second radar apparatuses 50 are used as the replacement for the ultrasonic sensor, no bezel is provided at the bumper, and therefore, coherence in the exterior design of the entire vehicle can be realized.

Application Example

The radar system 1 according to the present disclosure can implement a radar system that monitors all directions of the vehicle. This radar system is called an advanced driver-assistance system (ADAS). The ADAS is a generic term of a function for assisting driving, such as a function for causing an automobile itself to grasp peripheral information for driver's safety to properly display such a situation for a driver or properly warn the driver about such a situation or control the automobile on behalf of the driver.

Figure 15:
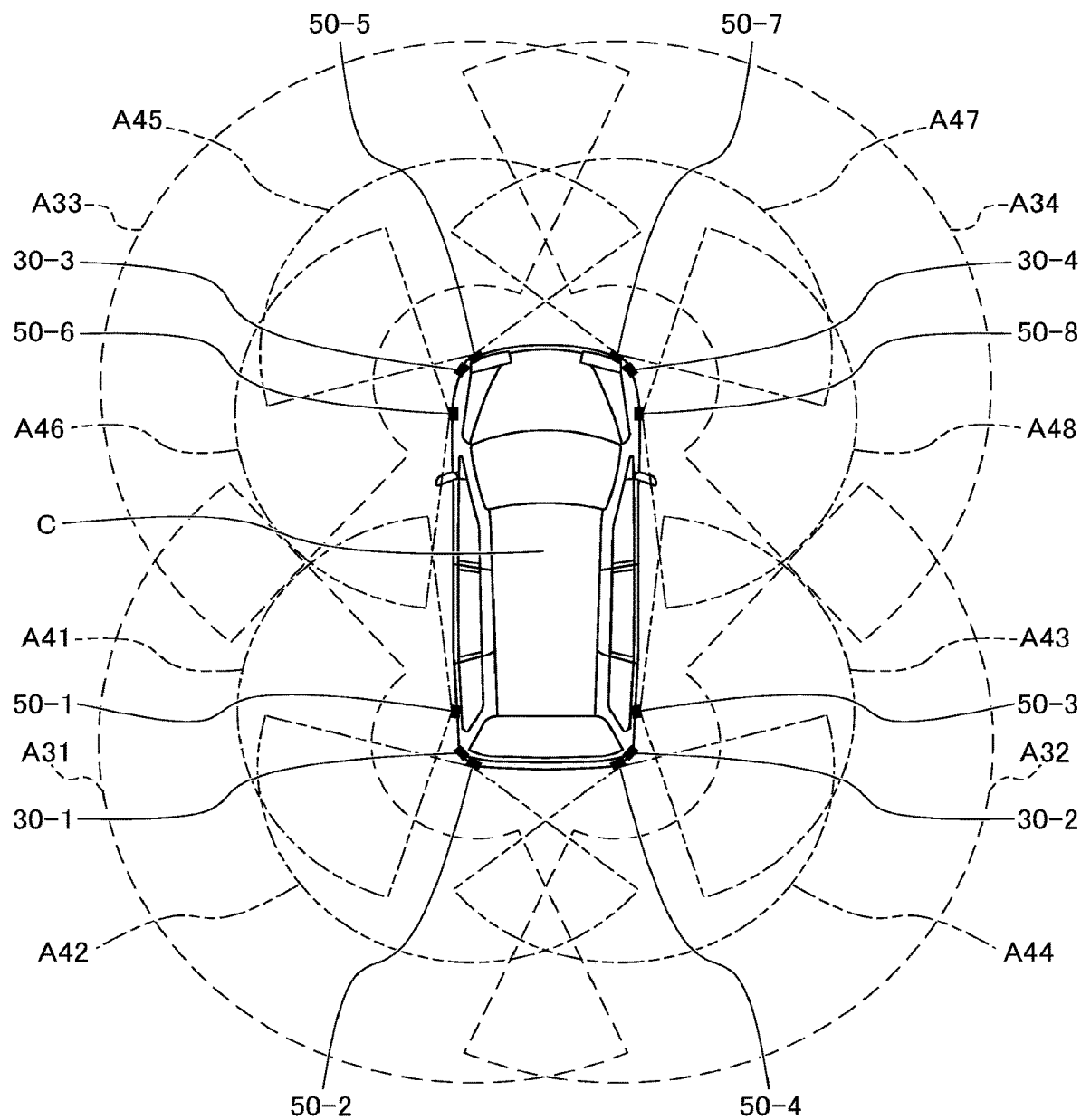
FIG. 15 is a view schematically showing a configuration of the radar system that senses a target at an entire periphery of the vehicle.

FIG. 15 is a view schematically showing the configuration of the radar system 1 that senses the target at the entire periphery of the vehicle. The radar system 1 includes a first radar apparatus 30-1 having a detection area A31, a first radar apparatus 30-2 having a detection area A32, a first radar apparatus 30-3 having a detection area A33, a first radar apparatus 30-4 having a detection area A34, a second radar apparatus 50-1 having a detection area A41, a second radar apparatus 50-2 having a detection area A42, a second radar apparatus 50-3 having a detection area A43, a second radar apparatus 50-4 having a detection area A44, a second radar apparatus 50-5 having a detection area A45, a second radar apparatus 50-6 having a detection area A46, a second radar apparatus 50-7 having a detection area A47, and a second radar apparatus 50-8 having a detection area A48.

The first radar apparatuses 30-1 to 30-4 and the second radar apparatuses 50-1 to 50-8 are arranged on the vehicle C such that the detection areas of the first radar apparatuses 30-1 to 30-4 and the second radar apparatuses 50-1 to 50-8 partially overlap with each other and cover the entire periphery of the vehicle C.

In a general radar system, a radar apparatus, a camera, an ultrasonic sensor, etc. are combined to monitor all directions of a vehicle. However, in this radar system, information acquired from each apparatus is not integrated (fusion), and each piece of information is processed independently. Further, the ultrasonic sensor has a low update rate, and for this reason, it is difficult to detect a target moving at a certain speed or higher. Thus, there is a problem that integration with information acquired by other apparatuses is difficult. Further, the hole is opened at the bumper such that the ultrasonic sensor is arranged in the hole, and the bezel closing the hole and protecting the ultrasonic sensor is provided at the bumper. Thus, there is a probability that the coherence in the design of the bumper is degraded.

In the radar system 1 according to the present disclosure, the master radar apparatus (e.g., the first radar apparatus 30-1) of the first radar apparatuses 30-1 to 30-4 integrates the information acquired by the other radar apparatuses (e.g., the first radar apparatuses 30-2 to 30-4) and the second radar apparatuses 50-1 to 50-8, and therefore, all directions of the vehicle can be monitored. Moreover, the radar system 1 can integrate (fusion) the information acquired only from the first radar apparatus 30 with a high update rate, and includes no ultrasonic sensor. Thus, the degree of freedom in the design of the bumper can be improved without degradation of the coherence in the design of the bumper.

(Processing Method)

Figure 16:
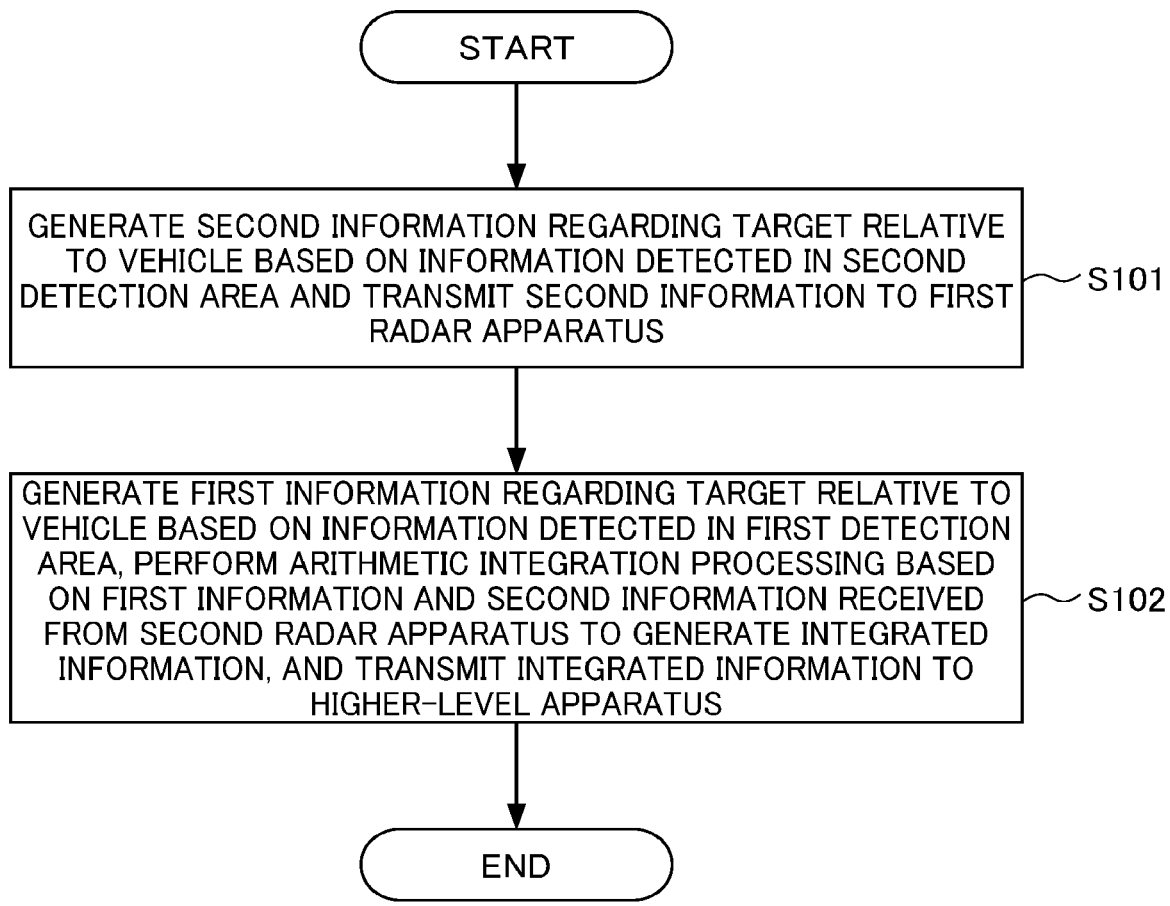
FIG. 16 is a flowchart showing steps of a processing method for enhancing the information processing efficiency of the entire system.

Next, a processing method that can enhance the information processing efficiency of the radar system 1 will be described. FIG. 16 is a flowchart showing the steps of this processing method.

The radar system 1 includes the radar apparatus 3 that is mounted on the vehicle and that transmits the predetermined signal to the outside of the vehicle and receives the predetermined signal from the outside of the vehicle to detect the information regarding the target relative to the vehicle. The radar apparatus 3 includes the first radar apparatus 30 that transmits and receives the signal with the first frequency and has the first detection area, and the second radar apparatus 50 that transmits and receives the signal with the second frequency different from the first frequency and has the second detection area different from the first detection area. The first radar apparatus 30 and the second radar apparatus 50 are arranged on the vehicle such that the first detection area and the second detection area partially overlap with each other.

At Step S101, the second radar apparatus 50 generates the second information regarding the target relative to the vehicle based on the information detected in the second detection area, and transmits the second information to the first radar apparatus 30 (a first step).

At Step S102, the first radar apparatus 30 generates the first information regarding the target relative to the vehicle based on the information detected in the first detection area, performs the arithmetic integration processing based on the first information and the second information received from the second radar apparatus 50 to generate the integrated information, and transmits the integrated information to the higher-level apparatus (a second step).

As described above, in the processing method according to the present disclosure, the second information generated in the second radar apparatus 50 is transmitted to the first radar apparatus 30 via the connection line 40, the first information and the second information are integrated to generate the integrated information in the first radar apparatus 30, and the generated integrated information is transmitted to the central processing unit 10 via the connection line 20. Thus, the information processing efficiency of the entire system can be enhanced.

(Processing Program)

A processing program for enhancing the information processing efficiency of the radar system 1 mainly includes the following steps, and is executed by a computer 500 (hardware).

The radar system 1 includes the radar apparatus 3 that is mounted on the vehicle and that transmits the predetermined signal to the outside of the vehicle and receives the predetermined signal from the outside of the vehicle to detect the information regarding the target relative to the vehicle. The radar apparatus 3 includes the first radar apparatus 30 that transmits and receives the signal with the first frequency and has the first detection area, and the second radar apparatus 50 that transmits and receives the signal with the second frequency different from the first frequency and has the second detection area different from the first detection area.

The first radar apparatus 30 and the second radar apparatus 50 are arranged on the vehicle such that the first detection area and the second detection area partially overlap with each other.

First Step: the step of generating the second information regarding the target relative to the vehicle based on the information detected in the second detection area and transmitting the second information to the first radar apparatus 30.

Second Step: the step of generating the first information regarding the target relative to the vehicle based on the information detected in the first detection area, performing the arithmetic integration processing based on the first information and the second information received from the second radar apparatus 50 to generate the integrated information, and transmitting the integrated information to the higher-level apparatus.

Figure 17:
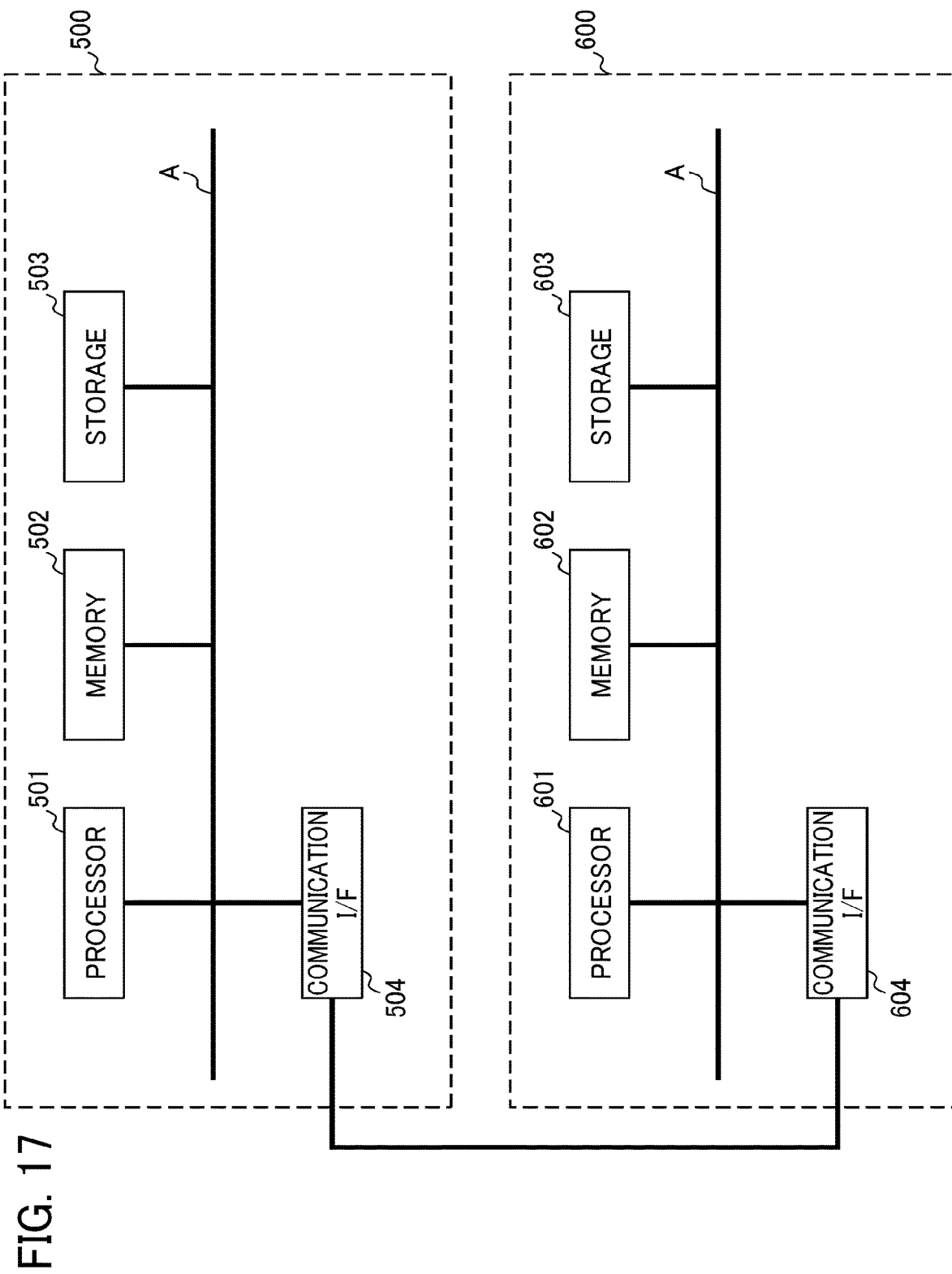
FIG. 17 is a diagram showing a configuration of a computer.

The configuration and operation of the computers 500, 600 will be described herein with reference to a figure. FIG. 17 is a diagram showing the configuration of the computers 500, 600. The computer 500 is equivalent to the first radar apparatus 30, and as shown in FIG. 17, is configured such that a processor 501, a memory 502, a storage 503, and a communication I/F 504 are connected to each other on a bus A. The computer 600 is equivalent to the second radar apparatus 50, and as shown in FIG. 17, is configured such that a processor 601, a memory 602, a storage 603, and a communication I/F 604 are connected to each other on the bus A. The computers 500, 600 implement the above-described first and second steps by cooperation of each component.

The communication I/F 504 and the communication I/F 604 are interfaces according to a predetermined communication standard (e.g., the controller area network (CAN)), and communicate with each other.

The memories 502, 602 include random access memories (RAMS). The RAM includes a volatile memory or a non-volatile memory.

The storages 503, 603 include read only memories (ROMs). The ROM includes a non-volatile memory, and for example, is implemented by a hard disc drive (HDD) or a solid state drive (SSD). The storage 503 stores various programs such as the processing program implemented at the above-described second step. The storage 503 stores various programs such as the processing program implemented at the above-described first step.

For example, the processors 501, 601 control the operation of the entirety of the computers 500, 600. The processors 501, 601 are arithmetic apparatuses that load an operating system or various programs for implementing various functions from the storages 503, 603 in the memories 502, 602 to execute an order included in the loaded program.

Specifically, in the case of accepting start-up operation (an operation signal), the processors 501, 601 read the programs (e.g., the processing programs according to the present disclosure) stored in the storages 503, 603 to load and execute the read programs in the memories 502, 602.

The configuration of the processors 501, 601 will be described herein. The processors 501, 601 are, for example, implemented by a central processing unit (CPU) or a micro processing unit (MPU).

The processor 501, 601 has been described as a single component, but the present disclosure is not limited to above. The processor 501, 601 may include a group of a plurality of physically-separated processors. In the present specification, the program described as being executed by the processor 501, 601 or the order included in such a program may be executed by a single processor, or may be decentrally executed by a plurality of processors. Alternatively, the program executed by the processor 501, 601 or the order included in such a program may be executed by a plurality of virtual processors.

As described above, the processing program according to the present disclosure is executed by the computers 500, 600 to transmit the second information generated in the second radar apparatus 50 to the first radar apparatus 30 via the connection line 40, integrate the first information and the second information to generate the integrated information in the first radar apparatus 30, and transmit the generated integrated information to the central processing unit 10 via the connection line 20. Thus, the information processing efficiency of the entire system can be enhanced.

Some embodiments of the present application have been described above in detail based on the drawings, but are mere examples. The present disclosure can be implemented in other forms to which various changes and modifications have been made based on the knowledge of those skilled in the art, including the aspects described in the disclosure of the present disclosure.

EXPLANATION OF REFERENCE NUMERALS

1 Radar System
3 Radar Apparatus
10 Central Processing Unit
20, 40 Connection Line
30, 30-1, 30-2 First Radar Apparatus
31, 51 I/F
32, 52 Control Unit
33, 53 Transmission Wave Generation Unit
34, 54 Transmission Unit
35, 37, 55, 57 Switch
38, 58 Reception Unit
39, 59 ADC
50, 50-1, 50-2, 50-3, 50-4 Second Radar Apparatus
70 Sensor Group
TX1a, TX1b, TX2a, TX2b Transmission Antenna
RX1a, RX1b, RX2a, RX2b Reception Antenna

The invention claimed is:

1. A radar system comprising:
a radar apparatus that is mounted on a vehicle and that transmits a predetermined signal to an outside of the vehicle and receives a predetermined signal from the outside of the vehicle to detect information regarding a target relative to the vehicle,
wherein the radar apparatus includes
a first master radar apparatus that transmits and receives a first master signal with a first frequency and has a first master detection area,
a first slave radar apparatus that transmits and receives a first slave signal with the first frequency and has a first slave detection area different from the first master detection area,
a second master radar apparatus that transmits and receives a second master signal with a second frequency different from the first frequency and has a second master detection area different from the first master detection area and the first slave detection area, and
a second slave radar apparatus that transmits and receives a second slave signal with the second frequency and has a second slave detection area different from the first master detection area, the first slave detection area, and the second master detection area, the first master radar apparatus, the first slave radar apparatus, the second master radar apparatus, and the second slave radar apparatus are arranged on the vehicle such that the first master detection area and the second master detection area partially overlap with each other and the first slave detection area and the second slave detection area partially overlap with each other, the second master radar apparatus is configured to generate second master information regarding the target relative to the vehicle based on information detected in the second master detection area and transmit the second master information to the first master radar apparatus, the second slave radar apparatus is configured to generate second slave information regarding the target relative to the vehicle based on information detected in the second slave detection area and transmit the second slave information to the first slave radar apparatus, the first slave radar apparatus is configured to generate first slave information regarding the target relative to the vehicle based on information detected in the first slave detection area, perform arithmetic integration processing based on the second master information received from the first master radar apparatus and the second slave information received from the second slave radar apparatus to generate second integrated information, and transmit the first slave information and the second integrated information to the first master radar apparatus, and the first master radar apparatus is configured to generate first master information regarding the target relative to the vehicle based on information detected in the first master detection area, transmit the second master information received from the second master radar apparatus to the first slave radar apparatus, perform arithmetic integration processing based on the first master information, and the first slave information and the second integrated information received from the first slave radar apparatus to generate first integrated information, and transmit the first integrated information to a higher-level apparatus.

2. The radar system according to claim 1, wherein the first master radar apparatus is configured to generate the first master information including information detected in the first master detection area and indicating a first distance to the target and a first speed and an angle relative to the target, and the second master radar apparatus is configured to generate the second master information including at least information detected in the second master detection area and indicating a second distance to the target and a second speed relative to the target.

3. The radar system according to claim 1, wherein a communication speed between the second master radar apparatus and the first master radar apparatus is equal to or lower than several tens of kilobits per second, and a communication speed between the first master radar apparatus and the higher-level apparatus is equal to or lower than several megabits per second.

4. A processing method in a radar apparatus that is mounted on a vehicle and that transmits a predetermined signal to an outside of the vehicle and receives a predetermined signal from the outside of the vehicle to detect information regarding a target relative to the vehicle, the radar apparatus including:

a first master radar apparatus that transmits and receives a first master signal with a first frequency and has a first master detection area;

a first slave radar apparatus that transmits and receives a first slave signal with the first frequency and has a first slave detection area different from the first master detection area;

a second master radar apparatus that transmits and receives a second master signal with a second frequency different from the first frequency and has a second master detection area different from the first master detection area and the first slave detection area; and a second slave radar apparatus that transmits and receives a second slave signal with the second frequency and has a second slave detection area different from the first master detection area, the first slave detection area, and the second master detection area; and the first master radar apparatus, the first slave radar apparatus, the second master radar apparatus, and the second slave radar apparatus being arranged on the vehicle such that the first master detection area and the second master detection area partially overlap with each other and the first slave detection area and the second slave detection area partially overlap with each other, the processing method comprising:

generating, by the second master radar apparatus, second master information regarding the target relative to the vehicle based on information detected in the second master detection area and transmitting the second master information to the first master radar apparatus;

transmitting, by the first master radar apparatus, the second master information received from the second master radar apparatus to the first slave radar apparatus;

generating, by the second slave radar apparatus, second slave information regarding the target relative to the vehicle based on information detected in the second slave detection area and transmitting the second slave information to the first slave radar apparatus;

generating, by the first slave radar apparatus, first slave information regarding the target relative to the vehicle based on information detected in the first slave detection area, performing arithmetic integration processing based on the second master information received from the first master radar apparatus and the second slave information received from the second slave radar apparatus to generate second integrated information, and transmitting the first slave information and the second integrated information to the first master radar apparatus; and generating, by the first master radar apparatus, first master information regarding the target relative to the vehicle based on information detected in the first master detection area, performing arithmetic integration processing based on the first master information, and the first slave information and the second integrated information received from the first slave radar apparatus to generate first integrated information, and transmitting the first integrated information to a higher-level apparatus.

5. A processing program used for a radar apparatus that is mounted on a vehicle and that transmits a predetermined signal to an outside of the vehicle and receives a predetermined signal from the outside of the vehicle to detect information regarding a target relative to the vehicle, the radar apparatus including:
a first master radar apparatus that transmits and receives a first master signal with a first frequency and has a first master detection area;
a first slave radar apparatus that transmits and receives a first slave signal with the first frequency and has a first slave detection area different from the first master detection area;
a second master radar apparatus that transmits and receives a second master signal with a second frequency different from the first frequency and has a second master detection area different from the first master detection area and the first slave detection area; and
a second slave radar apparatus that transmits and receives a second slave signal with the second frequency and has a second slave detection area different from the first master detection area, the first slave detection area, and the second master detection area; and
the first master radar apparatus, the first slave radar apparatus, the second master radar apparatus, and the second slave radar apparatus being arranged on the vehicle such that the first master detection area and the second master detection area partially overlap with each other and the first slave detection area and the second slave detection area partially overlap with each other,
the processing program causing a computer to execute
generating second master information regarding the target relative to the vehicle based on information detected in the second master detection area and transmitting the second master information to the first master radar apparatus,
transmitting the second master information received from the second master radar apparatus to the first slave radar apparatus,
generating second slave information regarding the target relative to the vehicle based on information detected in the second slave detection area and transmitting the second slave information to the first slave radar apparatus,
generating first slave information regarding the target relative to the vehicle based on information detected in the first slave detection area, performing arithmetic integration processing based on the second master information received from the first master radar apparatus and the second slave information received from the second slave radar apparatus to generate second integrated information, and transmitting the first slave information and the second integrated information to the first master radar apparatus, and
generating first master information regarding the target relative to the vehicle based on information detected in the first master detection area, performing arithmetic integration processing based on the first master information, and the first slave information and the second integrated information received from the first slave radar apparatus to generate first integrated information, and transmitting the first integrated information to a higher-level apparatus.

* * * * *